United States Patent
Sakurai

(10) Patent No.: US 10,686,794 B2
(45) Date of Patent: Jun. 16, 2020

(54) SYSTEM IN WHICH REDIRECT URL IS SET FOR EACH ACCESS RANGE OF RESOURCE, METHOD FOR THE SYSTEM, AND STORAGE MEDIUM FOR THE METHOD

(71) Applicant: CANON KABUSHIKI KAISHA, Tokyo (JP)

(72) Inventor: Yuka Sakurai, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 166 days.

(21) Appl. No.: 15/965,715

(22) Filed: Apr. 27, 2018

(65) Prior Publication Data

US 2018/0351958 A1 Dec. 6, 2018

(30) Foreign Application Priority Data

May 30, 2017 (JP) ................ 2017-107075

(51) Int. Cl.
*H04L 29/06* (2006.01)
*G06F 16/955* (2019.01)
*H04L 29/08* (2006.01)

(52) U.S. Cl.
CPC ........ *H04L 63/102* (2013.01); *G06F 16/9566* (2019.01); *H04L 63/0884* (2013.01); *H04L 67/02* (2013.01); *H04L 67/42* (2013.01); *H04L 63/083* (2013.01)

(58) Field of Classification Search
CPC ....................................... H04L 63/10
See application file for complete search history.

(56) References Cited

U.S. PATENT DOCUMENTS

| 2012/0173670 A1* | 7/2012 | Shinada | G06F 21/604 709/217 |
| 2013/0086645 A1* | 4/2013 | Srinivasan | H04L 63/10 726/4 |
| 2013/0124756 A1* | 5/2013 | Voronel | H04L 63/126 709/239 |

(Continued)

FOREIGN PATENT DOCUMENTS

| JP | 2009271817 | * 12/2012 | ............. G06F 21/20 |
| JP | 2016-085641 A | 5/2016 | |
| WO | WO-2013049461 A2 * | 4/2013 | ............. H04L 63/10 |

OTHER PUBLICATIONS

Jimmy Q, "how to use return URL", posted on Nov. 8, 2008, https://forums.asp.net/t/1345257.aspx?how+to+use+return+url (Year: 2008).*

*Primary Examiner* — Taghi T Arani
*Assistant Examiner* — Lin Chang
(74) *Attorney, Agent, or Firm* — Canon U.S.A., Inc. IP Division

(57) ABSTRACT

Embodiments of the disclosure relate to a system including a terminal having a Web browser, a client, a resource server, and an authorization server. According to some embodiments, the client creates a redirect URL indicating a transmission destination of an authorization code used for obtaining an access token for each customer tenant, and the client that has received a request for starting a coordination from a Web browser transmits the redirect URL of a customer tenant specified from information transmitted by the Web browser to the resource server together with a client creation reservation.

11 Claims, 17 Drawing Sheets

(56) References Cited

U.S. PATENT DOCUMENTS

| | | | | |
|---|---|---|---|---|
| 2014/0380428 A1* | 12/2014 | Kobayashi | ............ | G06F 21/335 |
| | | | | 726/4 |
| 2014/0380429 A1* | 12/2014 | Matsugashita | ...... | H04L 63/0823 |
| | | | | 726/4 |
| 2015/0293732 A1* | 10/2015 | Kyoo | .................... | G06F 21/608 |
| | | | | 358/1.14 |

* cited by examiner

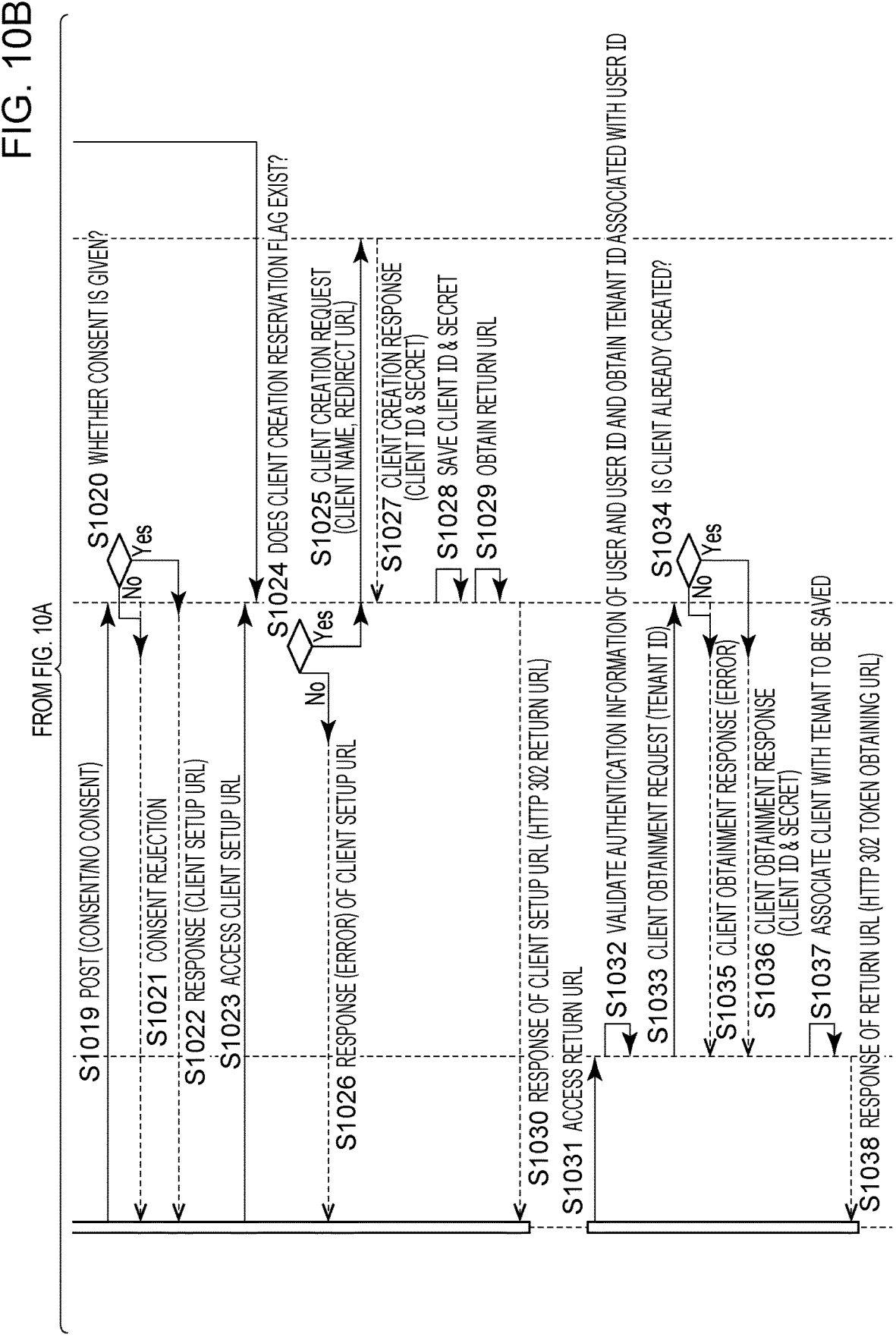

FIG. 11

LOGIN SCREEN

USER ID

PASSWORD login

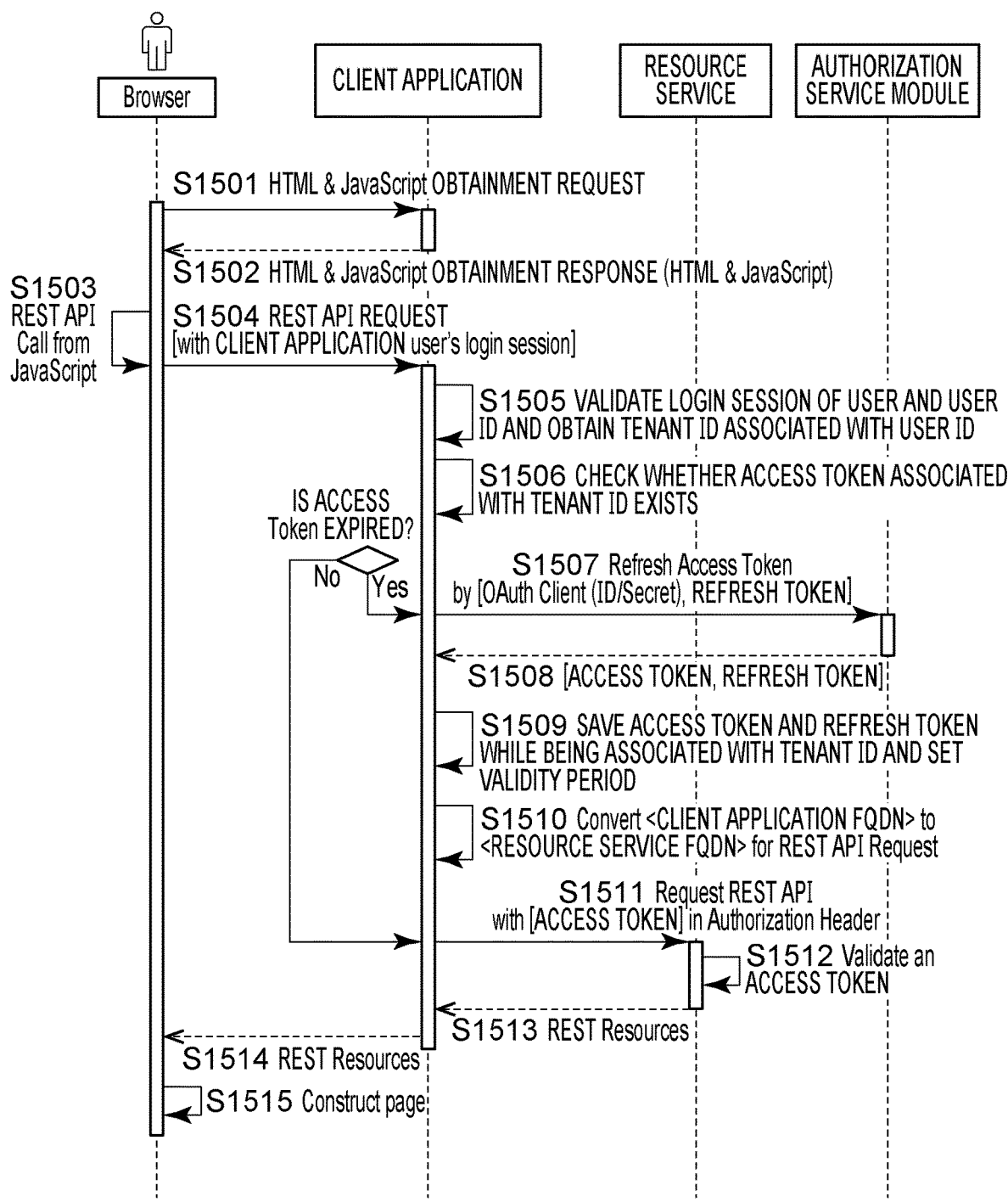

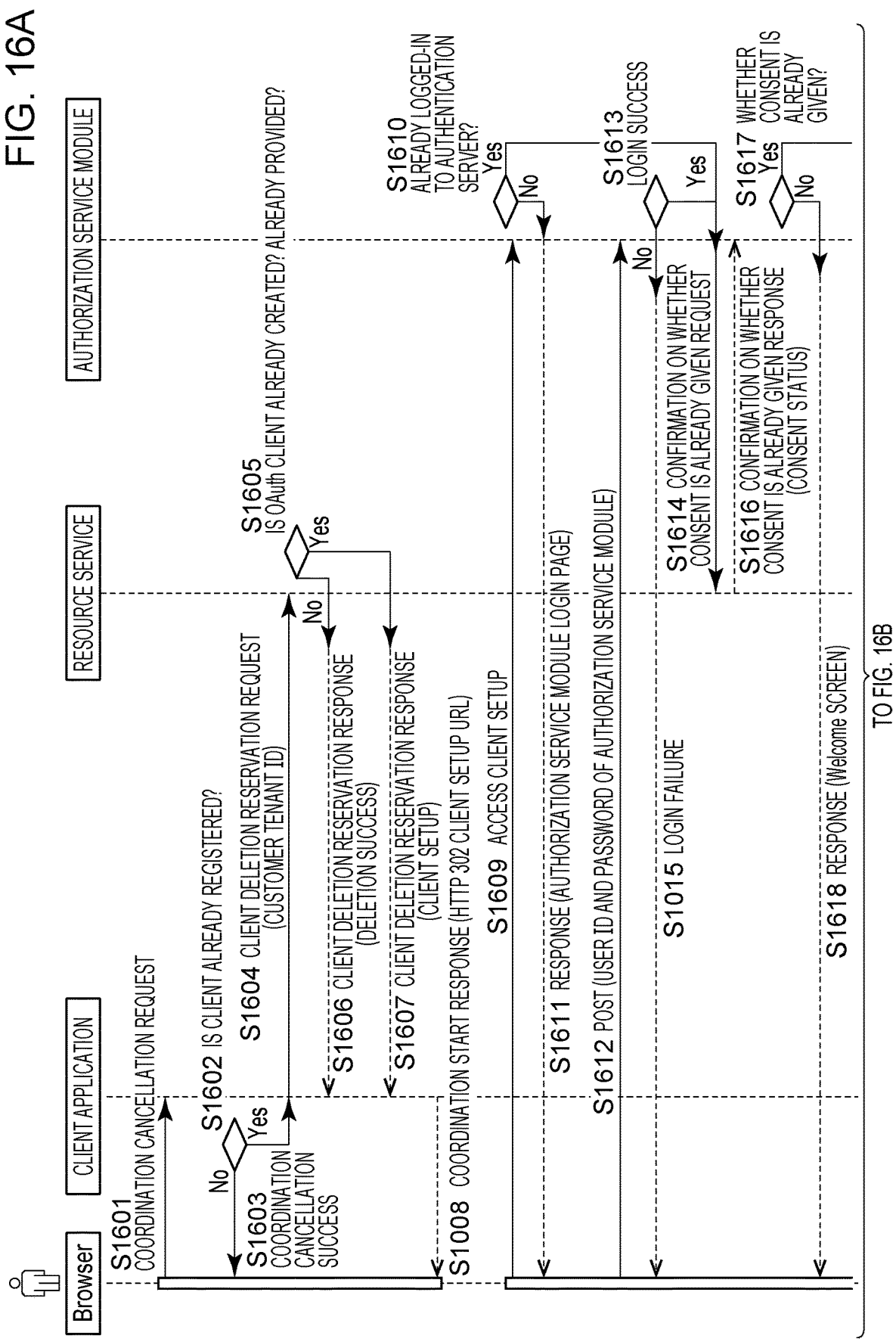

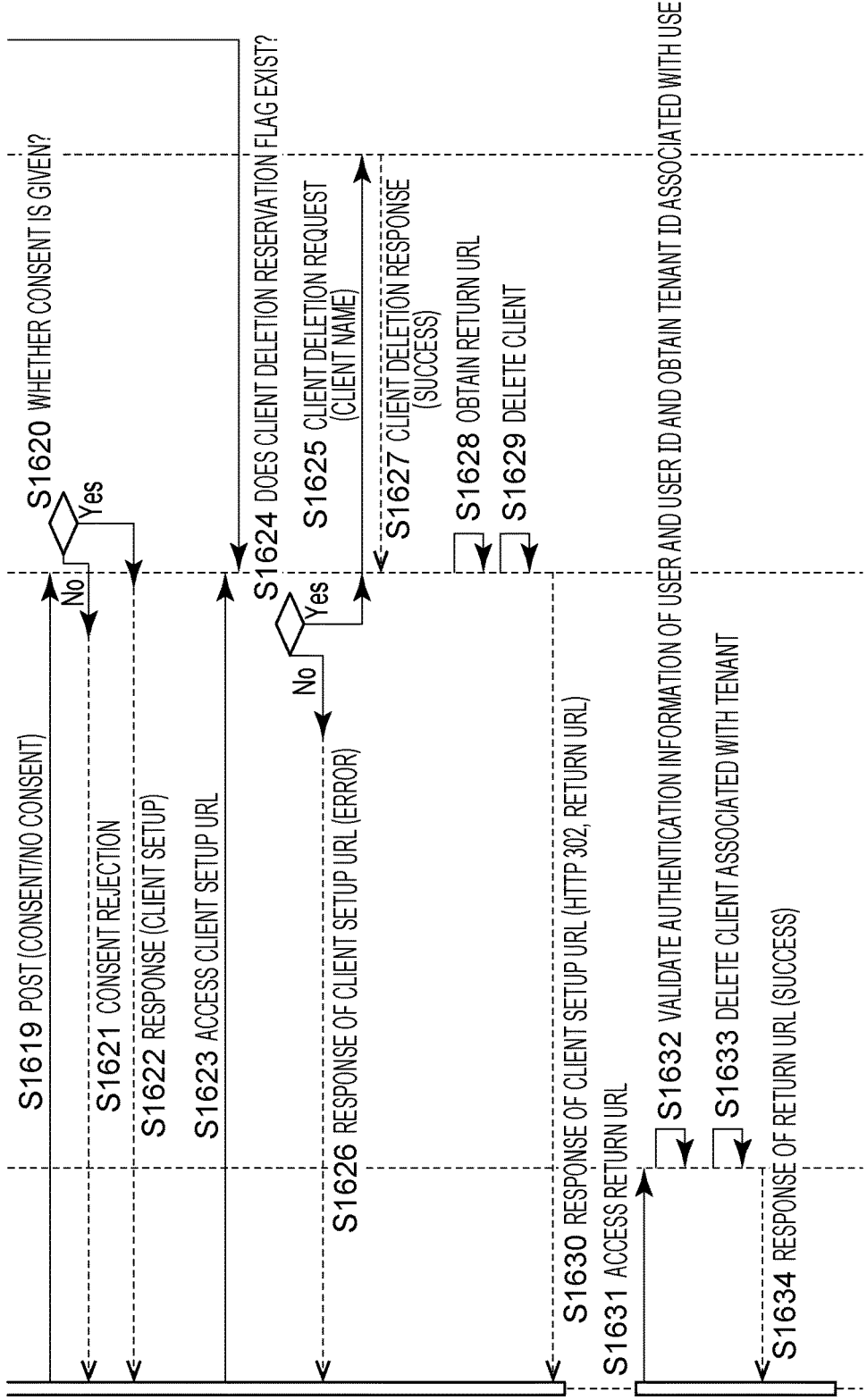

SYSTEM IN WHICH REDIRECT URL IS SET FOR EACH ACCESS RANGE OF RESOURCE, METHOD FOR THE SYSTEM, AND STORAGE MEDIUM FOR THE METHOD

BACKGROUND OF THE INVENTION

Field of the Invention

The present invention relates to a system in which a plurality of services are coordinated, a method for the system, and a storage medium for the method.

Description of the Related Art

Managed print service (MPS) is an outsourcing service for visualizing and analyzing a printing environment of a customer to offer an optimal environment to a business firm side and providing a one-stop service from an actual environment construction to an operation and support after a consent formation is reached.

One aspect of the MPS is a device management service for collecting, aggregating, and browsing data including personal information related to the printing environment of the customer for a sales company serving as a service providing vendor to visualize and analyze the printing environment in the business firm. According to the device management service, the service is provided when a user gives consent for permitting a user of the sales to manage and browse data of the customer.

In recent years, the service is being provided on the Internet from the viewpoint of cost of the service operation, and also a value-added service is being provided while a plurality of services are coordinated with each other. However, several issues occur when the plurality of services are coordinated with each other. For example, more information than desired by the user is exchanged between the services, and there is a risk of leakage of user data or personal information. On the other hand, a method of the service coordination is preferably to be easily implemented for the benefit of the service provider. In the above-described circumstances, a standard protocol related to authorization called OAuth has been established.

According to OAuth, an access token is issued to each user for each service to be used, and an access is performed by using the access token, so that it is possible to realize the access under an authority of a user who performs an authorization without authentication information of the user. For this reason, strict and appropriate management of the access tokens is needed, and it is important to correctly associate the access tokens and access ranges of the respective coordinated services with one other (see Japanese Patent Laid-Open No. 2016-85641).

SUMMARY OF THE INVENTION

A system according to embodiments of the present invention includes a terminal including a Web browser, a client server including a client application used from the Web browser, a resource server configured to provide a resource in accordance with a service request from the client application, and an authorization server configured to authenticate a user and also issue an access token indicating that an authority of the user in the resource server is transferred in accordance with an authorization of the authenticated user, in which the client application includes a creation unit configured to create a redirect URL indicating a transmission destination of an authorization code used for obtaining the access token for each tenant, the client application that has received a request for starting a coordination from the Web browser includes a first transmission unit configured to transmit the redirect URL of a client tenant specified from information transmitted by the Web browser to the resource server together with a client creation reservation, the resource server that has received the client creation reservation includes a second transmission unit configured to transmit the redirect URL to the authorization server together with a client creation request, the authorization server that has received the client creation request includes a first storage unit configured to store created client information and the redirect URL while being associated with each other, the authorization server includes a redirect request unit configured to request the Web browser to redirect to the redirect URL of the client tenant specified from the information transmitted by the Web browser in a case where the authorization code is created in accordance with the user who has authorized a transfer of the authority in the resource server to the client application via the Web browser, and the client application that has received the authorization code from the Web browser that accesses in accordance with an instruction of the redirect includes a second storage unit configured to receive the access token from the authorization server on a basis of the authorization code and the client information and store a tenant ID of the client tenant corresponding to the redirect URL and the access token while being associated with each other.

Further features of the present invention will become apparent from the following description of exemplary embodiments with reference to the attached drawings.

BRIEF DESCRIPTION OF THE DRAWINGS

FIGS. 10A and 10B illustrate an example of a client creating sequence according to the exemplary embodiment of the present invention.

FIG. 11 illustrates an example of a login screen of a resource service according to the exemplary embodiment of the present invention.

FIG. 15 illustrates an example of an API calling sequence according to the exemplary embodiment of the present invention.

FIGS. 16A and 16B illustrate an example of a client deleting sequence according to the exemplary embodiment of the present invention.

DESCRIPTION OF THE EMBODIMENTS

An OAuth client is one of elements needed for issuing an access token according to OAuth. The OAuth client is information of an ID and secret for certifying a service where the access token is desired to be obtained. To issue the OAuth client, a redirect URL (transmission destination of an authorization code needed for obtaining the access token) which is determined by the service where the access token is desired to be obtained is needed. In addition, security is guaranteed while a check is performed in combination of the ID and secret of the OAuth client issued by an authorization service and the redirect URL. The OAuth client is information for certifying the service, and one OAuth client is issued for each service corresponding to a coordination source according to a related-art technology. Therefore, since the redirect URL is set for each OAuth client, only one redirect URL can be set with respect to a single service. For this reason, in the case of a mode in which the service is provided in units of customer like the MPS, the redirect URL is not set in units of customer corresponding to an access range of a resource, and there is a fear that a state in which a service request is from a valid customer is not guaranteed.

To address the above-described issue, embodiments of the present invention aim at providing a method for setting a redirect URL for each access range of a resource to improve security.

Hereinafter, exemplary embodiments for carrying out the present invention will be described with reference to the drawings.

First Exemplary Embodiment

According to the present exemplary embodiment, it is assumed that the device management service that manages a peripheral device of the customer and collects and aggregates a counter, a job, alert information, and the like of the peripheral device to perform report creation and dashboard display is installed in the server on the Internet. Hereinafter, a service that provides a function on the Internet like the device management service will be referred to as a "resource service".

In addition, descriptions will be provided while it is assumed that an integration system that provides a function for the customer by consolidating functions and contents of the plurality of services into a single portal uses the resource service. Hereinafter, an application using the resource service like the integration system will be referred to as a "client application". The resource service is of course not limited to the device management service, and the client application is not limited to the integration system.

Furthermore, the method of OAuth is in the authority transfer according to the present exemplary embodiment. According to an authority transfer protocol such as OAuth, the access token is used as information for certifying the authority transferred from a user.

Descriptions on a System Configuration Diagram

Figure 1:
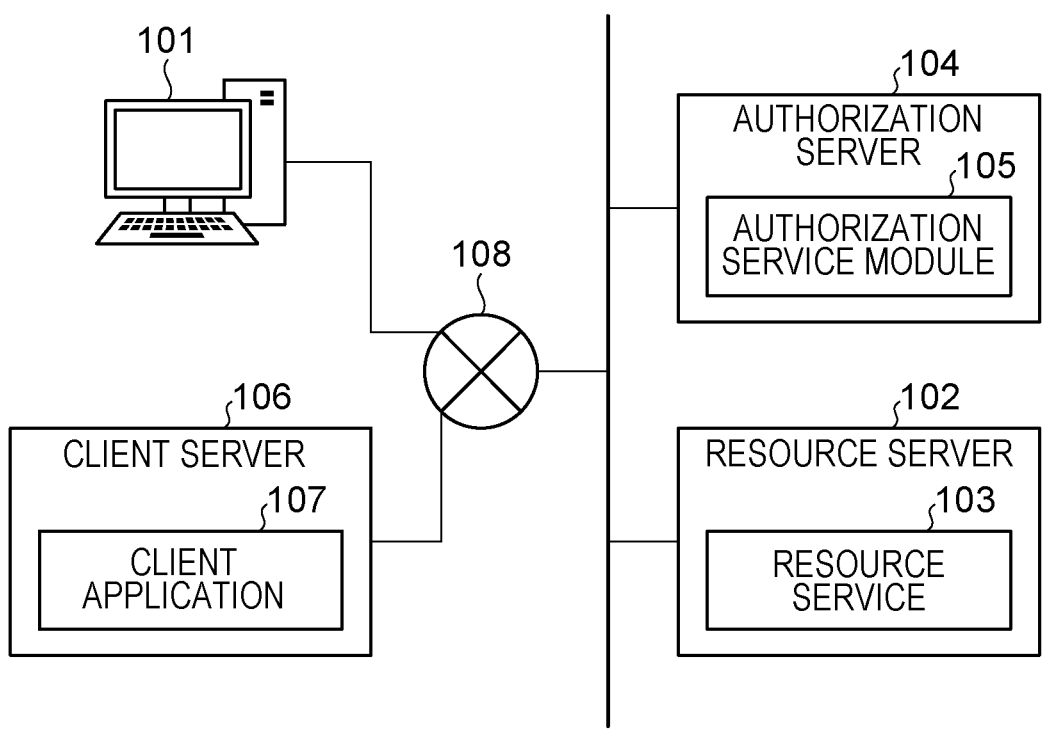
FIG. 1 illustrates an example of a system overall configuration according to an exemplary embodiment of the present invention.

FIG. 1 is a block diagram illustrating an overall configuration of a system according to the present exemplary embodiment. The system according to the present exemplary embodiment is provided with a management terminal 101, a resource server 102, an authorization server 104, and a client server 106. A network 108 is a network based on a related-art technology such as the Internet. The client server 106 realizes a client in the OAuth. According to the present exemplary embodiment, a client application 107 which is coordinated with a resource service 103 is installed in the client server 106. The client application 107 is software that realizes the integration system. The client application 107 is configured to distinguish and manage the resource of the customer in the resource server 102 in units of customer and allow only a customer user who can access the resource to perform the access to the resource. The customer user uses the resource service 103 by using the client application 107. The customer user accesses the client application 107 of the client server 106 via a Web browser 701 of the management terminal 101. Then, the customer user uses the service by using the resource provided by the resource service 103.

The client server 106 is connected to a LAN different from that of the resource server 102 and the authorization server 104. The resource server 102 realizes the resource server 102 in the OAuth. According to the present exemplary embodiment, the resource service 103 is installed in the resource server 102. An application that provides the device management service is installed in the resource service 103. It should be noted that the number of the resource services 103 installed in the single resource server 102 may be one or more. The customer user can directly access the resource service 103 by using the Web browser 701 included in the management terminal 101 and use the service by using the resource provided by the resource service 103.

A device management system manages a resource of a customer or a sales company in units of tenant (for example, a customer tenant or a sales company tenant) to be associated with a user who can access the tenant (for example, a customer user of the customer tenant or a sales company user of the sales company tenant). With this configuration, only the user who can access the tenant can access the resource associated with the tenant. Furthermore, the device management system according to the present exemplary embodiment is not only used for the customer user to grasp a use situation of the peripheral device but also used for a sales user to grasp the use situation of the peripheral device of a handling customer. For this reason, it is assumed that the service can be started when the customer user gives consent to an access action by the sales user to a customer resource (resource associated with the customer tenant).

The authorization server 104 is compatible with the OAuth, and an authorization service module 105 is installed in the authorization server 104. The authorization service module 105 provides functions of authentication and authorization of the resource service 103. It is assumed that the resource server 102 and the authorization server 104 exist in the same authentication domain.

Diagram Illustrating an H/W Configuration of the Client Server 106, the Resource Server 102, the Authorization Server 104

Figure 2:
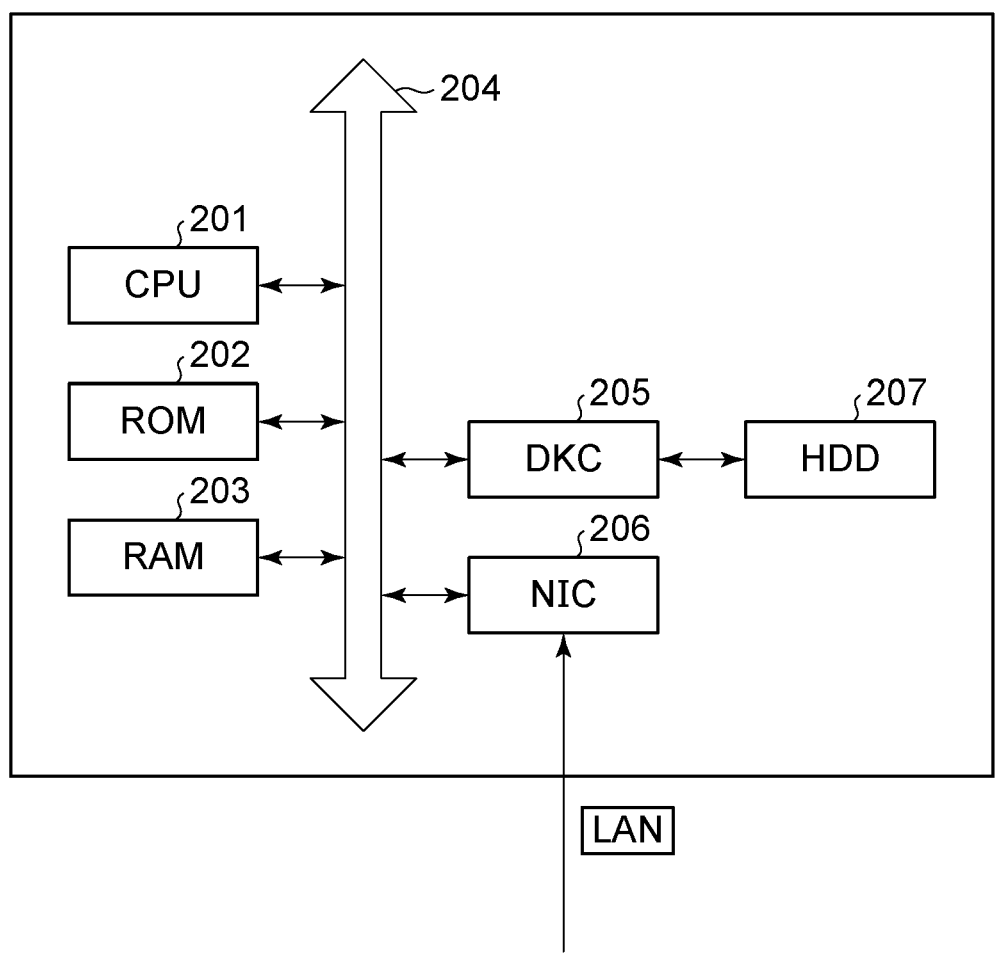
FIG. 2 illustrates an H/W configuration of a client server, a resource server, and an authorization server according to the exemplary embodiment of the present invention.

FIG. 2 is a block diagram for describing an example of an H/W configuration of the client server 106, the resource server 102, and the authorization server 104. A hard disc drive (HDD) 207 stores a software program functioning as an entire operation main constituent which will be described below according to the present exemplary embodiment. The client server 106, the resource server 102, and the authorization server 104 are provided with a CPU 201, a ROM 202, a RAM 203, a DKC 205, a NIC 206, and the HDD 207.

The CPU 201 realizes respective processing described according to the respective exemplary embodiments by executing the software stored in the ROM 202 or the hard disc drive (HDD) 207 serving as a large scale storage device. The CPU 201 controls each of devices connected to a system bus 204 in an overall manner. The RAM 203 functions as a main memory, a work area, or the like of the CPU 201. The disc controller (DKC) 205 controls the HDD 207. The network interface card (NIC) 206 exchanges data with another node via the network in a bidirectional manner. A firewall which is not illustrated in the drawing may also be installed between the NIC 206 and the network.

Drawing Illustrating a Software Configuration of the Client Application 107

Figure 3:
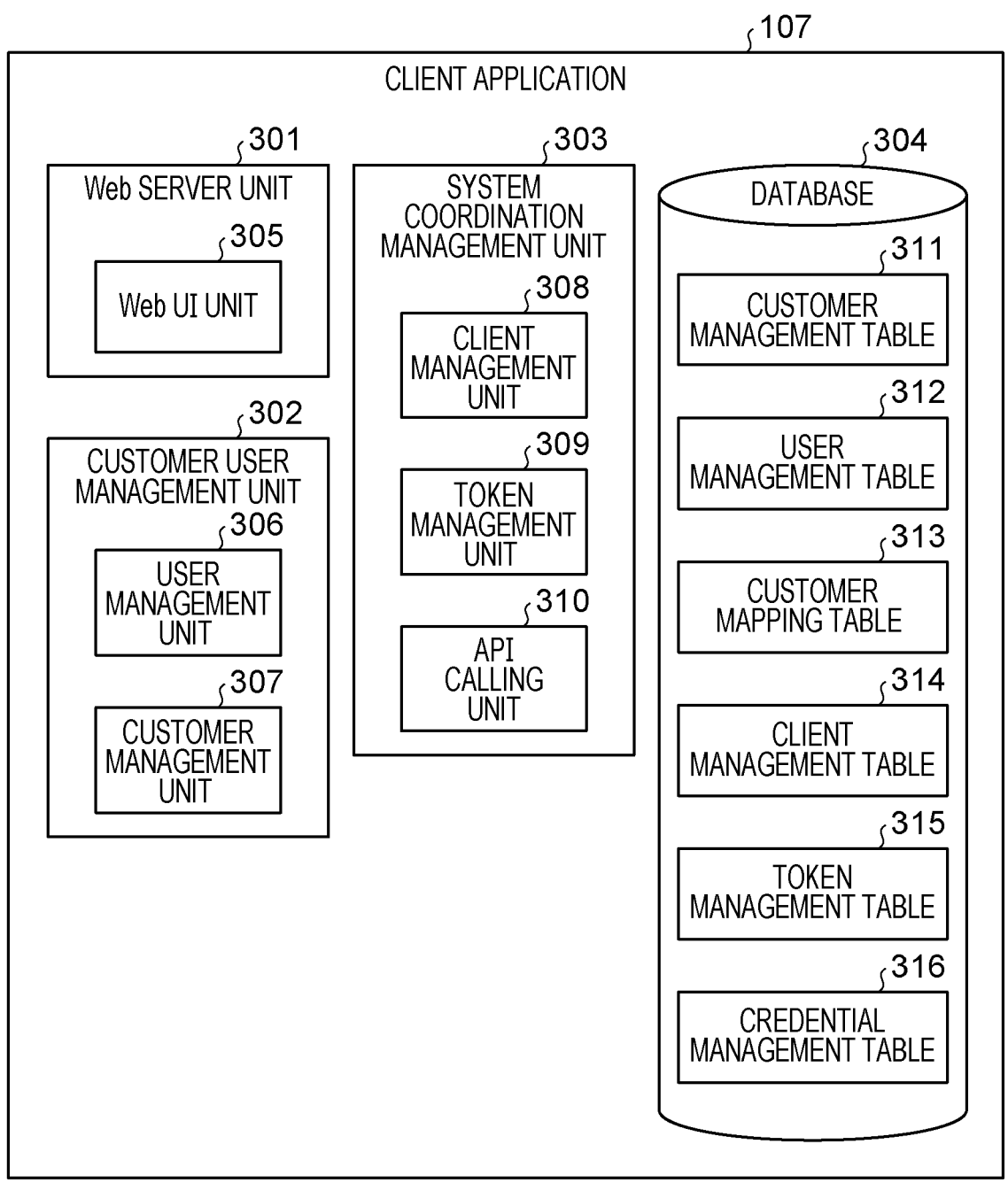
FIG. 3 illustrates a software configuration of a client application according to the exemplary embodiment of the present invention.

FIG. 3 is a block diagram illustrating an example of a software configuration of the client application 107. A software function of FIG. 3 is realized when the CPU 201 executes the software stored in the ROM 202 or the HDD 207. The client application 107 is provided with a Web server unit 301, a customer user management unit 302, a system coordination management unit 303, and a database 304.

The Web server unit 301 receives an HTTP or HTTPS request from the management terminal 101 via the NIC 206 and returns a response to the network to provide the service. The Web server unit 301 is provided with a Web UI unit 305. The Web UI unit 305 receives the HTTP request from the Web browser 701 of the management terminal 101. The Web UI unit 305 is coordinated with a user management unit 306, and the user management unit 306 performs a user authentication. In a case where the user authentication succeeds, the user management unit 306 transmits HTML data to the Web browser 701.

The customer user management unit 302 is provided with the user management unit 306 and a customer management unit 307. The customer management unit 307 manages customer information registered in the client application 107. Information related to the customer is managed by a customer management table 311 on the basis of the ID for uniquely identifying the customer. In addition, the association between the customer registered in the client application 107 and the customer of the resource service 103 is managed. Association information of the customer is managed by a customer mapping table 313. The customer to be registered in the client application 107 is created when the sales user who has the authority with which the customer tenant can be created accesses the Web UI unit 305 from the Web browser 701 of the management terminal 101. Then, the previously created customer of the resource service 103 is associated from the Web UI unit 305.

The user management unit 306 manages information related to the user to be associated with the customer managed by the customer management unit 307 for the management. The user information of the client application 107 is created by creating the customer tenant and creating the user. The user of the sales company and an administrating user of the customer who has the authority of the user creation may also create the user information. The user creation can be performed by accessing the Web UI unit 305 from the Web browser 701 of the management terminal 101. Association information between the customer and the user is managed by a user management table 312.

When the user management unit 306 receives the HTTP request from the Web browser 701, an HTML of a login screen is returned. The Web browser 701 displays the login screen. When the authentication information such as a user ID and a password is input by a user operation, these pieces of authentication information are added to the request to be transmitted to the client application 107. The user management unit 306 receives the authentication information and instructs the Web browser 701 to redirect to a requested screen in the case of authentication success when a combination of the user ID and the password is correct. With regard to the redirected Web UI unit 305, the Web UI unit 305 generates an HTML of the requested screen and replies the HTML to the Web browser 701.

The system coordination management unit 303 is provided with a client management unit 308, a token management unit 309, and an API calling unit 310. The client management unit 308 manages the OAuth client used for obtaining the token for realizing a coordination with the resource service 103. The client management unit 308 performs processing of creating, obtaining, and deleting the OAuth client. OAuth is managed for each customer of the resource service 103 and managed by a client management table 314.

The token management unit 309 manages a token used when the resource service 103 is to be coordinated. The token management unit 309 performs token obtaining processing. The token is managed for each customer of the resource service 103 and managed by a token management table 315. The API calling unit 310 calls out an API for accessing the resource of the resource service 103.

The system coordination management unit 303 intentionally distinguishes and uses the token used when the resource service 103 is to be coordinated. For example, in a case where the customer user accesses the client application 107 by using the Web browser 701 of the management terminal 101 and uses the service using the resource of the resource service 103, a token obtained by authenticating the customer user (resource owner) is used. That is, the API needs to be called by using an access token obtained by an Authorization Code grant method. In a case where an access is made to the resource of the resource service 103 without the intermediation of the customer user, a token obtained without the authentication of the resource owner is used. That is, the API is called by using an access token obtained by a Client Credentials grant method. Specifically, this is a case where the customer creation of the resource service 103 is accepted from the client application 107 via the API, or the like. The authentication for the OAuth client and the token information managed by the system coordination management unit 303 is correctly performed when similar information is managed by the authorization service module 105. The OAuth client and the token used by the Authorization Code grant method are managed as the resource of the customer in the authorization service module 105. The OAuth client and the token used by the Client Credentials grant method are managed by the resource of the sales company.

The database 304 is provided with the customer management table 311, the user management table 312, the customer mapping table 313, the client management table 314, the token management table 315, and a credential management table 316. Descriptions thereof will be provided with reference to Tables 1 to 6.

TABLE 1

Company management table

| Customer ID | Customer name | Address | Area | ... |
|---|---|---|---|---|
| C001 | A Corporation | Tokyo | Minato-ku | |
| C002 | B Corporation | Osaka | Umeda | |

In Table 1, information of the customer registered in the client application 107 is stored in the customer management table 311. An ID for identifying the customer is stored in a customer ID. A displayed name of the customer is stored in a customer name. An address of the customer is stored in an address. Area information to which the customer belongs is stored in an area. In addition to the above, the information related to the customer is managed in the customer management table 311. According to the present exemplary embodiment, the user of the sales company who has the authority for registering the customer in the client application 107 accesses the Web UI unit 305 from the Web browser 701 of the management terminal 101 to register the customer, so that the customer information is registered in this table.

TABLE 2

User management table

| User ID | Password | Customer ID | Type | ... |
|---|---|---|---|---|
| U001 | xxxxxx | C001 | Administrator | |
| U002 | yyyyyy | C001 | General | |

Table 2 is the user management table 312 where the information of the user registered in the client application 107 is managed. An ID for identifying the user is stored in the user ID. A password used when the user authentication is performed is stored in the password. The customer ID is a unique ID for uniquely identifying the customer and is associated with the customer ID managed in the customer management table 311. In this table, management is performed on which customer the user belongs to. A type represents a type of an authority of the user. For example, an administrator or general is stored. According to the present exemplary embodiment, the user of the sales company who has the authority for registering the user in the client application 107 or the customer user accesses the Web UI unit 305 from the Web browser 701 of the management terminal 101 to create a user or newly create a customer, so that the user information is registered in this table.

TABLE 3

Customer mapping management table

| Customer ID | Customer tenant ID | ... |
|---|---|---|
| C001 | M 001 | |
| C002 | M 002 | |

Table 3 is the customer mapping table 313 where mapping information of the client application 107 and the customer of the resource service 103 is managed. An ID for uniquely identifying the customer registered in the client application 107 is stored in the customer ID. The ID is associated with the customer ID of the customer management table 311.

An ID for uniquely identifying the customer tenant registered in the resource service 103 is stored in a customer tenant ID. The same ID as the customer tenant ID of a customer tenant information table 409 and a tenant management table 513 which will be described below is stored as the customer tenant ID. According to the present exemplary embodiment, the user of the sales company who has the authority for associating the customer of the client application 107 (customer ID) and the customer of the resource service 103 (customer tenant ID) with each other accesses the Web UI unit 305 from the Web browser 701 of the management terminal 101 to perform the association, so that the association information is registered in this table. It should be noted that the customer ID and the customer tenant ID may be the same information, and in this case, a customer mapping management table is not needed.

TABLE 4

Client management table

| Customer tenant ID | Client ID | Client secret | Redirect URL | Return URL |
|---|---|---|---|---|
| M 001 | C ID 001 | ************ | https://m001/red_1 | https://m001/retu_1 |
| M 002 | C ID 002 | ************ | https://m001/red_2 | https://m001/retu_2 |

Table 4 is the client management table 314 where management is performed in a manner that the OAuth client used for obtaining a token, which is used when system coordination is performed with the resource service 103, is associated with an tenant ID. The OAuth client is created for each customer tenant and managed in the client management table for each customer tenant.

An ID for uniquely identifying the customer registered in the resource service 103 is stored in the customer tenant ID. The customer tenant ID is associated with the customer tenant ID of the customer mapping table 313. A client ID and a client secret are an ID and a secret for uniquely identifying the OAuth client. The client secret is encrypted to be stored. An ID and a secret issued in the authorization service module 105 are stored in the client ID and the client secret. A transmission destination for returning the authorization code used for obtaining the token, that is, an end point is stored in a redirect URL. The redirect URL is created by including the customer tenant ID in a URL when the client management unit 308 performs client creation reservation.

A URL to which transition is to be made after a completion of a client creation flow is stored in a return URL. The return URL is created by including the customer tenant ID in a URL when the client management unit 308 performs the client creation reservation. A token obtaining flow and the client creation flow will be described below in detail. With regard to information managed in the client management table 314, contents similar to a client management table 411 of the resource service 103 and a client management table 511 of the authorization service module 105 are managed.

TABLE 5

Token management table

| Customer tenant ID | Access token | Access token validity time | Refresh token | Refresh token validity date and time | Authorization code | ... |
|---|---|---|---|---|---|---|
| M 001 | AT_0001 | 2016/9/9 11:00:00 | RT_0001 | 2017/9/9 11:00:00 | auth_001 | |
| M 002 | AT_0002 | 2016/12/9 11:00:00 | RT_0002 | 2017/12/9 11:00:00 | auth_002 | |

Table 5 is the token management table 315 where the client application 107 manages the token used when accessing the resource service 103. An ID for uniquely identifying the customer registered in the resource service 103 is stored in the customer tenant ID. The customer tenant ID is associated with the customer tenant ID of the customer mapping table 313. An access token obtained from the authorization service module 105 by the client application 107 in the token obtaining flow is stored in the access token. A validity time of the access token is stored in an access token validity time. A refresh token obtained from the authorization service module 105 by the client application 107 in the token obtaining flow is stored in the refresh token. Validity date and time of the refresh token are stored in refresh token validity date and time. An authorization code obtained from the authorization service module 105 by the client application 107 in the token obtaining flow is stored in the authorization code.

The customer user accesses the client application 107 by using the Web browser 701 of the management terminal 101 and uses the service of the client application 107 using the resource of the resource service 103. The client application 107 validates the authentication information and the user ID transmitted as Cookie information from the Web browser 701. Subsequently, the customer tenant ID associated with the user ID is obtained on the basis of the user management table 312 and the customer mapping table 313.

Subsequently, the client application 107 validates whether or not the access token associated with the tenant ID exists on the basis of the token management table 315. When the tenant ID exists, the resource of the resource service 103 is obtained by using the access token to provide the service. According to the present exemplary embodiment, the access token is managed for each customer ID of the resource service 103, and the user belonging to the tenant of the customer ID of the client application 107 associated with the customer tenant ID of the resource service 103 in the customer management table 311 shares the access token, but the access token may be issued and managed for each customer user.

client secret are an ID and a secret for uniquely identifying the OAuth client. The client secret is encrypted to be stored. The ID and the secret issued in the authorization service module 105 are obtained and stored in the client ID and the client secret. Token obtained from the OAuth client by the client application 107 on the basis of the Client Credentials grant method are stored in the access token and the refresh token. Validity times of the respective tokens are stored in the access token validity time and the refresh token validity date and time. An authorization code obtained by the client application 107 from the authorization service module 105 in the token obtaining flow is stored in the authorization code. Information managed in the credential management table 316 is used in a case where the resource service 103 is accessed without the intermediation of the customer user.

Diagram Illustrating a Software Configuration of the Resource Service 103

Figure 4:
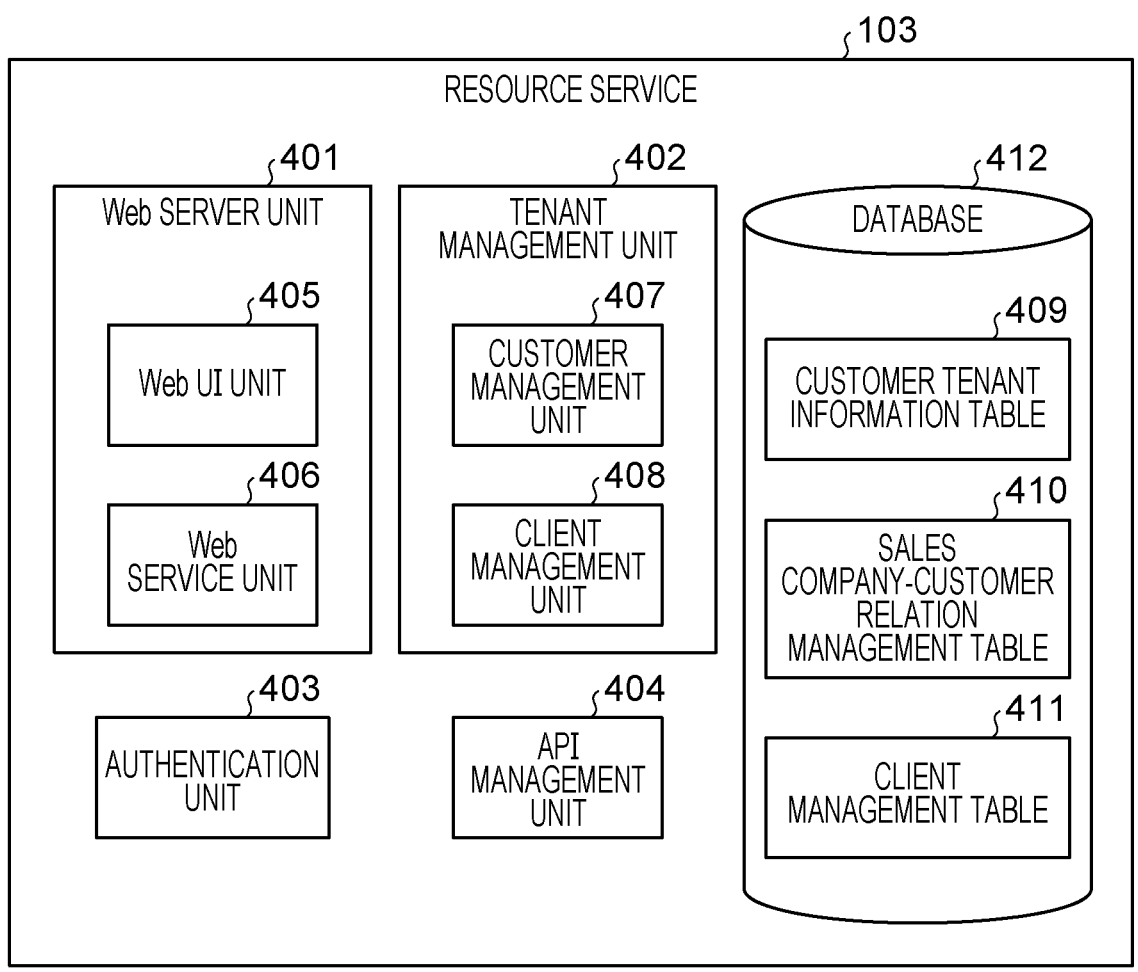
FIG. 4 illustrates a software configuration of a resource service according to the exemplary embodiment of the present invention.

FIG. 4 is a block diagram illustrating an example of a software configuration of the resource service 103. A software function of FIG. 4 is realized when the CPU 201 executes the software stored in the ROM 202 or the HDD 207. The resource service 103 is provided with a Web server unit 401, a tenant management unit 402, an authentication unit 403, an API management unit 404, and a database 412. Since the Web server unit 401 is similar to the Web server unit 301, descriptions thereof will be omitted.

A Web UI unit 405 receives the HTTP request from the Web browser 701 of the management terminal 101. The Web UI unit 405 is coordinated with the authentication unit 403, and the authentication unit 403 requests the authorization service module 105 for the authentication. In a case where the user authentication succeeds, the Web browser 701 is transmitted to the HTML data. A Web service unit 406 receives a Web service request such as REST and replies a response such as XML data.

The authentication unit 403 is coordinated with the authorization service module 105 to perform the authentication of the user or the system. In a case where the user accesses the resource service 103 from the Web browser 701, when the authentication unit 403 receives the HTTP request from the

TABLE 6

Credential management table

| Client ID | Client secret | Redirect URL | Access token | Access token validity time | Refresh token | Refresh token validity date and time |
|---|---|---|---|---|---|---|
| C ID 0000 | ********* | https://dev01/red_0 | AT_000 | 2016/3/3 12:55:12 | RT_000 | 2017/3/3 12:55:12 |

Table 6 is the credential management table 316 where the access token used when the client application 107 accesses the resource service 103 is managed. The client ID and the Web browser 701, the authentication unit 403 returns the HTML of the login screen. The Web browser 701 displays the login screen. When pieces of the authentication information such as the user ID and the password are input by the user operation, the Web browser 701 adds these pieces of authentication information to the request to be transmitted to the resource service 103. The authentication unit 403 receives the authentication information and enquires the authorization service module 105 whether or not the authentication information and the combination of the user ID and the password are correct. When the authentication success is returned from the authorization service module 105, the authentication unit 403 instructs the Web browser 701 to redirect to the requested screen. The redirected Web UI unit 405 regenerates an HTML of the requested screen and replies the HTML to the Web browser 701. In a case where the Web service unit 406 receives a request from the client application 107, the authentication unit 403 requests the authorization service module 105 for the validation of the access token embedded in an authentication header. When the authentication success is returned, a request within a range of the resource that can be accessed on the basis of the access token is accepted from the client application 107.

The tenant management unit 402 is provided with a customer management unit 407 and a client management unit 408. The customer management unit 407 manages the customer tenant registered in the resource service 103. The customer management unit 407 manages by the ID for uniquely identifying the customer tenant, and the information related to the customer tenant is managed in the customer tenant information table 409. First, the user of the sales company who has the authority with which the customer tenant can be created accesses the Web UI unit 405 of the authorization service module 105 from the Web browser 701 and registers the customer tenant. Subsequently, the Web UI unit 405 of the resource service 103 is accessed to register the customer tenant in the resource service 103. The resource service 103 enquires the authorization service module 105 on the user of the sales company who has performed the registration operation of the customer tenant to identify the tenant ID and performs the association between the tenant ID of the sales company and the tenant ID of the registered customer. The association between the tenant ID of the sales company and the tenant ID of the customer is managed by a sales company-customer relation management table 410 as the resource of the sales company.

The client management unit 408 manages the OAuth client used when the client application 107 performs the system coordination with the resource service 103. The OAuth client is managed by the client management table 411, and one OAuth client is registered for each client application 107 as the resource of the customer while being associated with the tenant ID of the customer tenant information table 409. The API management unit 404 manages the API for accessing the resource managed by the resource service 103. According to the present exemplary embodiment, the request based on REST is received, but another request mode such as OAP may also be adopted. The database 412 is provided with the customer tenant information table 409, the sales company-customer relation management table 410, and the client management table 411. This will be described with reference to Tables 7 to 9.

TABLE 7

Customer tenant information table

| Customer tenant ID | Customer name | Address | Area | ... |
|---|---|---|---|---|
| M 001 | A Corporation | Tokyo | Minato-ku | |
| M 002 | B Trading | Osaka | Umeda | |

Table 7 is the customer tenant information table 409 where information of the client registered in the resource service 103 is stored. An ID for identifying the client is stored in the customer tenant ID. Data similar to the tenant ID of the customer mapping table 313 is stored. A display name of the customer is stored in a customer name. An address of the customer is stored in an address. Area information to which the customer belongs is stored in an area. In addition to the above, the information related to the customer is managed in the customer tenant information table 409.

TABLE 8

Sales company-customer relation management table

| Sales company tenant ID | Customer tenant ID | Consent status | ... |
|---|---|---|---|
| H 001 | M 001 | Consent is already given | |
| H 001 | M 002 | Consent is already given | |
| H 001 | M 003 | Consent is not yet given | |

Table 8 is the sales company-customer relation management table 410 where relation information between the sales company and the customer registered in the resource service 103 is stored. An ID for identifying the sales company is stored in a sales company tenant ID. An ID for identifying the client is stored in the customer tenant ID. The ID is associated with the customer tenant ID in the customer tenant information table 409. Status information on whether the customer user gives consent for the user of the sales company to access its own resource is stored in a consent status. It should be noted that, according to the present exemplary embodiment, when the customer user uses the resource service 103, the service is not started until the consent for the user of the sales company to access the customer resource is given

TABLE 9

Client management table

| Customer tenant ID | Application ID | Customer tenant client ID | Customer tenant client secret | Redirect URL | Return URL | Status | ... |
|---|---|---|---|---|---|---|---|
| M 001 | C ID 000 | C ID 001 | ********** | https://m001/red_1 | https://m001/retu_1 | Already created | |

TABLE 9-continued

Client management table

| Customer tenant ID | Application ID | Customer tenant client ID | Customer tenant client secret | Redirect URL | Return URL | Status | ... |
|---|---|---|---|---|---|---|---|
| M 002 | C ID 000 | C ID 002 | ********** | https://m002/red_2 | https://m002/retu_2 | Waiting to be created | |

Table 9 is the client management table 411 where the OAuth client information used for obtaining the token for the client application 107 to perform the system coordination with the resource service 103 is stored. An ID for identifying the client is stored in the customer tenant ID. The ID is associated with the customer tenant ID in the customer tenant information table 409. An ID for identifying the client application 107 corresponding to a client creation request source is stored in an application ID. The customer tenant the client ID and the customer tenant the client secret are an ID and a secret for uniquely identifying the OAuth client. The customer tenant the client secret is encrypted to be stored.

An end point to which is delivered the authorization code used for obtaining the token is stored in the redirect URL. A URL to which the transition is to be made after the completion of the client creation flow is stored in the return URL. The return URL corresponds to a notification destination for notifying that the client creation is completed. A status of the creation situation of the OAuth client is stored in a status. Specifically, the status includes waiting for the creation, creation already performed, provision already performed, waiting for the deletion, and the like.

When the client creation reservation request is obtained from the client application 107, the resource service 103 sets a reservation flag by setting the status of the client management table 411 as waiting for the creation. Subsequently, the Web browser 701 is caused to redirect to the end point of the client setup, and the authorization is given from the resource owner to request the authorization service module 105 for the creation of the OAuth client. When the OAuth client is created, the status is set as creation already performed, and the redirect process to the return URL specified by the client application 107 is performed. Subsequently, when the client obtainment request is obtained from the client application 107, the status is set as provision already performed to return the OAuth client.

It should be noted that the resource service 103 accepts the client creation reservation request any number of times in a case where the status is set as waiting for the creation. In this case, the client creation reservation request is accepted on the basis of the lastly requested contents. The request of the client deletion is also requested similarly as in the client creation. When the client deletion reservation request is accepted in a case where the status is creation already performed or provision already performed, the resource service 103 obtains the permission from the customer user (resource owner) to request the authorization service module 105 for the OAuth client deletion and deletes the OAuth client information saved in the resource service 103. When the client deletion reservation request is accepted in a case where the status is set as waiting for the creation, the record is deleted from the client management table 411 without the permission of the customer user (resource owner). This is because an OAuth client deletion request does not need to be issued in this case since the OAuth client does not exist in the authorization service module 105.

Diagram Illustrating a Software Configuration of the Authorization Service Module 105

Figure 5:
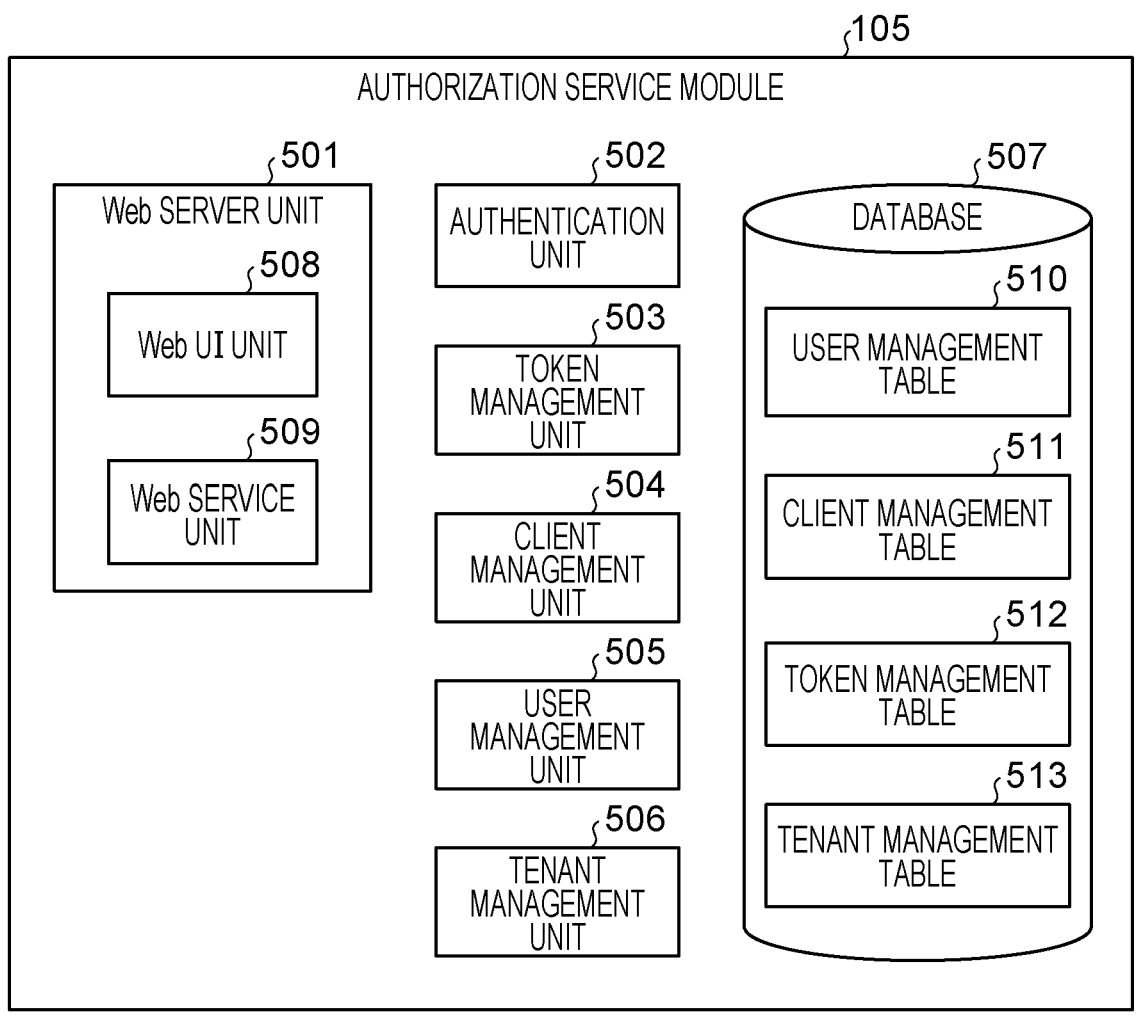
FIG. 5 illustrates a software configuration of an authorization service module according to the exemplary embodiment of the present invention.

FIG. 5 is a block diagram illustrating an example of a software configuration of the authorization service module 105. A software function of FIG. 5 is realized when the CPU 201 executes the software stored in the ROM 202 or the HDD 207. The authorization service module 105 is provided with a Web server unit 501, an authentication unit 502, a token management unit 503, a client management unit 504, a user management unit 505, a tenant management unit 506, and a database 507. Since the Web server unit 501 is similar to the Web server unit 401, descriptions thereof will be omitted.

A Web UI unit 508 receives the HTTP request from the Web browser 701 of the management terminal 101. The Web UI unit 508 is coordinated with the authentication unit 502, and the authentication unit 502 requests the authorization service module 105 for the authentication. In a case where the user authentication succeeds, the HTML data is transmitted to the Web browser 701. A Web service unit 509 receives a Web service request such as REST and replies a response such as XML data. The authentication unit 502 performs the authentication of the user or the system.

In a case where the customer user or the sales company user accesses the authorization service module 105 from the Web browser 701, when the authentication unit 502 receives the HTTP request from the Web browser 701, the Web UI unit 508 returns the HTML of the login screen. The Web browser 701 displays the login screen. When the authentication information such as the user ID and the password is input by the user operation, the authentication unit 502 validates whether or not the user is a user already registered in a user management table 510. Subsequently, when the user is already registered, these pieces of authentication information are added to Cookie information of the Web browser 701. Subsequently, an HTML of a menu screen is generated in the Web UI unit 508 and replied to the Web browser 701. In a case where the resource service 103 requests the Web service unit 509 for the validation of the token, the validation of the token is performed on the basis of a token management table 512.

The tenant management unit 506 manages the tenant registered in the authorization service module 105. The tenant is managed by the ID for uniquely identifying the tenant in the tenant management table 513. The type includes the customer tenant and the sales company tenant. First, the user of the sales company who has the authority with which the customer tenant can be created accesses the Web UI unit 508 from the Web browser 701 and creates the customer tenant. When the customer tenant is created, the tenant ID is issued and saved in the tenant management table 513.

The user management unit 505 manages the user registered in the authorization service module 105. The user is managed by the ID for uniquely identifying the user in the user management table 510. When the user creates the customer tenant, the customer user who has an administrator authority is created and saved in the user management table 510. In addition, the user who has a user creation authority may perform the creation.

The client management unit 504 manages the OAuth client used when the client application 107 performs the system coordination with the resource service 103. The OAuth client is managed in the client management table 511 and associated with the tenant ID in the tenant management table 513 to be registered as the resource of the associated tenant ID.

The token management unit 503 performs management such as creation and deletion of the token. The token is managed in the token management table 512 while being associated with the user ID of the user management table 510. The database 507 includes the user management table 510, the client management table 511, the token management table 512, and the tenant management table 513. Descriptions thereof will be provided with reference to Tables 10 to 13.

TABLE 10

User management table

| User ID | Password | User type | Tenant ID | ... |
|---|---|---|---|---|
| U ID 001 | **** | Administrator | M 001 | |
| U ID 002 | **** | General | M 001 | |

Table 10 is the user management table 510 where the user of the authorization service module 105 is managed. An ID and a password for uniquely identifying the user are stored in the user ID and the password. Information on whether the user is a user of the sales company or a customer user and whether the user is an administrator or a general user is stored in the user identification. The authorization service module 105 has a function of authenticating each user by validating the pair of the user ID and the password and generating the authentication information when the combination is correct.

TABLE 11

Client management table

| Client ID | Client secret | Redirect URL | Client name | Grant type | ... |
|---|---|---|---|---|---|
| C ID 000 | ******* | https://dev01/red_0 | Client OO | Client Credential | |
| C ID 001 | ******* | https://m 001/red_1 | Client A | Auth Code | |
| C ID 002 | ******** | https://m 002/red_2 | Client B | Auth Code | |

Table 11 is the client management table 511 where the OAuth client is managed. The client ID and the client secret are an ID and a password for uniquely identifying the OAuth client.

The end point to which the authorization code used for obtaining the token is returned is stored in the redirect URL. A display name of the client is stored in a client name. A grant type of the OAuth is stored in a grant type. For example, the access token obtained by using the client ID and the secret in which the grant type is the Client Credentials grant is used as the token used when the client application 107 transmits the client creation request and the client obtainment request to the resource service 103. The access token obtained by using the client ID and the secret in which the grant type is the Authorization Code grant is used as the token used when the customer user accesses the resource of the resource service 103 from the client application 107.

TABLE 12

Token management table

| Token ID | Token type | Validity period | Refresh token ID | Refresh time limit | Client | User ID | ... |
|---|---|---|---|---|---|---|---|
| AT_000 | Authorization token | 2016/3/12:55 | RT_000 | 2017/3/3 12:55 | C ID 000 | U ID 000 | |
| auth_000 | Authorization code | | | | C ID 000 | U ID 000 | |
| AT_001 | Authorization token | 2016/9/9 11:00 | RT_001 | 2017/9/9 11:00 | C ID 001 | U ID 001 | |
| auth_001 | Authorization code | | | | C ID 001 | U ID 001 | |
| AT_002 | Authorization token | 2016/12/9 11:00 | RT_002 | 2017/12/9 11:00 | C ID 002 | U ID 005 | |
| auth_002 | Authorization code | | | | C ID 002 | U ID 005 | |

Table 12 is the tenant management table 513 where the token information is managed. An ID for uniquely identifying the token is stored in the token ID. Information indicating a type of the token is stored in a token type. Specifically, an authentication token, the access token, the authorization code, and the like are stored. Information of a validity period of the token is stored in a validity period. An ID for uniquely identifying the refresh token is stored in a refresh token ID. Information of the validity period of the refresh token is stored in a refresh period. The client ID is an ID for uniquely identifying the OAuth client and is associated with the client ID of the client management table 511. An ID for uniquely identifying the user is stored in the user ID. The user ID is associated with the user ID of the user management table 510.

Diagram Illustrating an H/W Configuration of the Management Terminal 101

Figure 6:
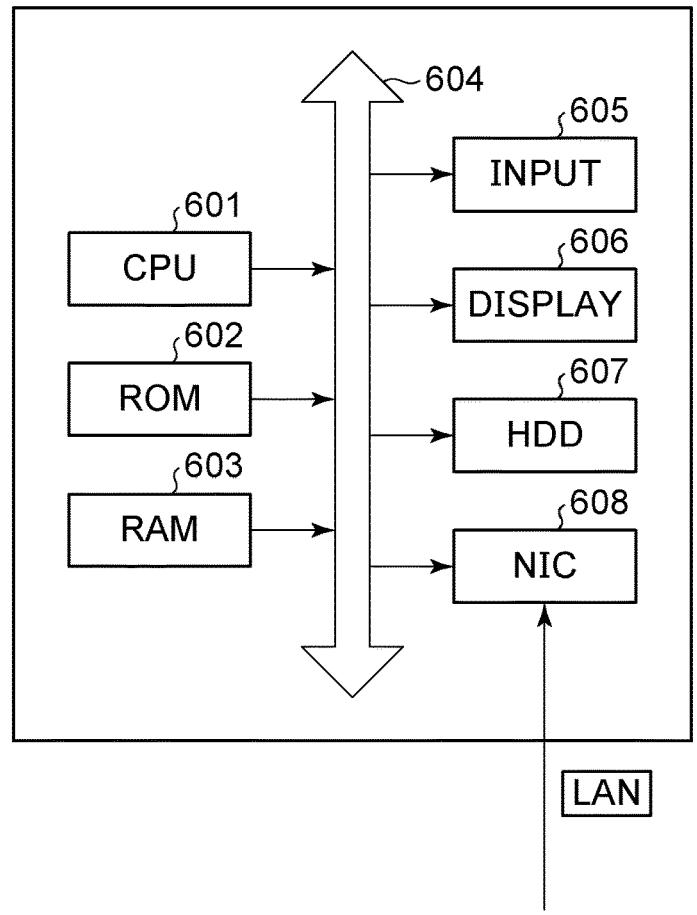
FIG. 6 illustrates an H/W configuration of a management terminal according to the exemplary embodiment of the present invention.

FIG. 6 is a block diagram illustrating an example of an H/W configuration of the management terminal 101. A CPU 601 realizes respective processes described according to respective exemplary embodiments by executing software stored in a ROM 602 or an HDD 607 serving as a largescape storage device. The CPU 601 controls respective devices connected to a system bus 604 in an overall manner. A RAM 603 functions as a main memory, a work memory, or the like of the CPU 601. An input apparatus (INPUT) 605 is a key board, a mouse, a touch panel, a button, or the like and provides an input unit of the user operation. A display module (DISPLAY) 606 is a display module constituted by a liquid crystal display or the like. A network interface card (NIC) 608 exchanges data with another node via the network 108 in a bidirectional manner.

Diagram Illustrating a Software Configuration of the Management Terminal 101

Figure 7:
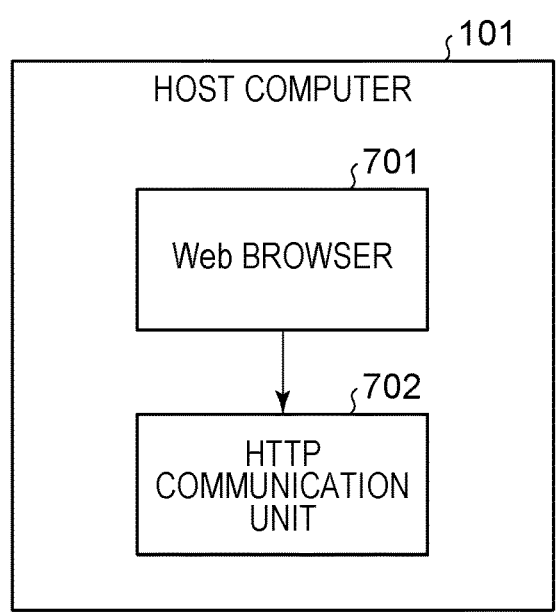
FIG. 7 illustrates a software configuration of the management terminal according to the exemplary embodiment of the present invention.

FIG. 7 is a block diagram illustrating an example of a software configuration of the management terminal 101. The software function of FIG. 7 is realized when the CPU 601 executes the software stored in the ROM 602 or the HDD 607.

The management terminal 101 is provided with the Web browser 701 and an HTTP communication unit 702. The Web browser 701 transmits information obtainment request to the HTTP communication unit 702 by specifying the URL and obtains the HTML data. The Web browser 701 analyzes the HTML data obtained by using the HTTP communication unit 702 and performs screen drawing with respect to the display module 606. The Web browser 701 also accepts the user operation with respect to the control within the display screen from the input apparatus 605 and transmits a request to the HTTP communication unit 702 in accordance with operation contents.

The HTTP communication unit 702 accepts the communication request from the Web browser 701 and communicates with the Web server by using the HTTP or HTTPS protocol, so that the request of a Webpage, reception of Webpage data, and the like are performed. The user of the sales company or the customer user specifies the URL of the resource service 103 or the client application 107 in the Web browser 701 of the management terminal 101 and accesses the Web server unit 301 and the Web server unit 401, so that it is possible to use the function of the resource service 103 or the client application 107.

Flow of the System Coordination Start

Figure 8:
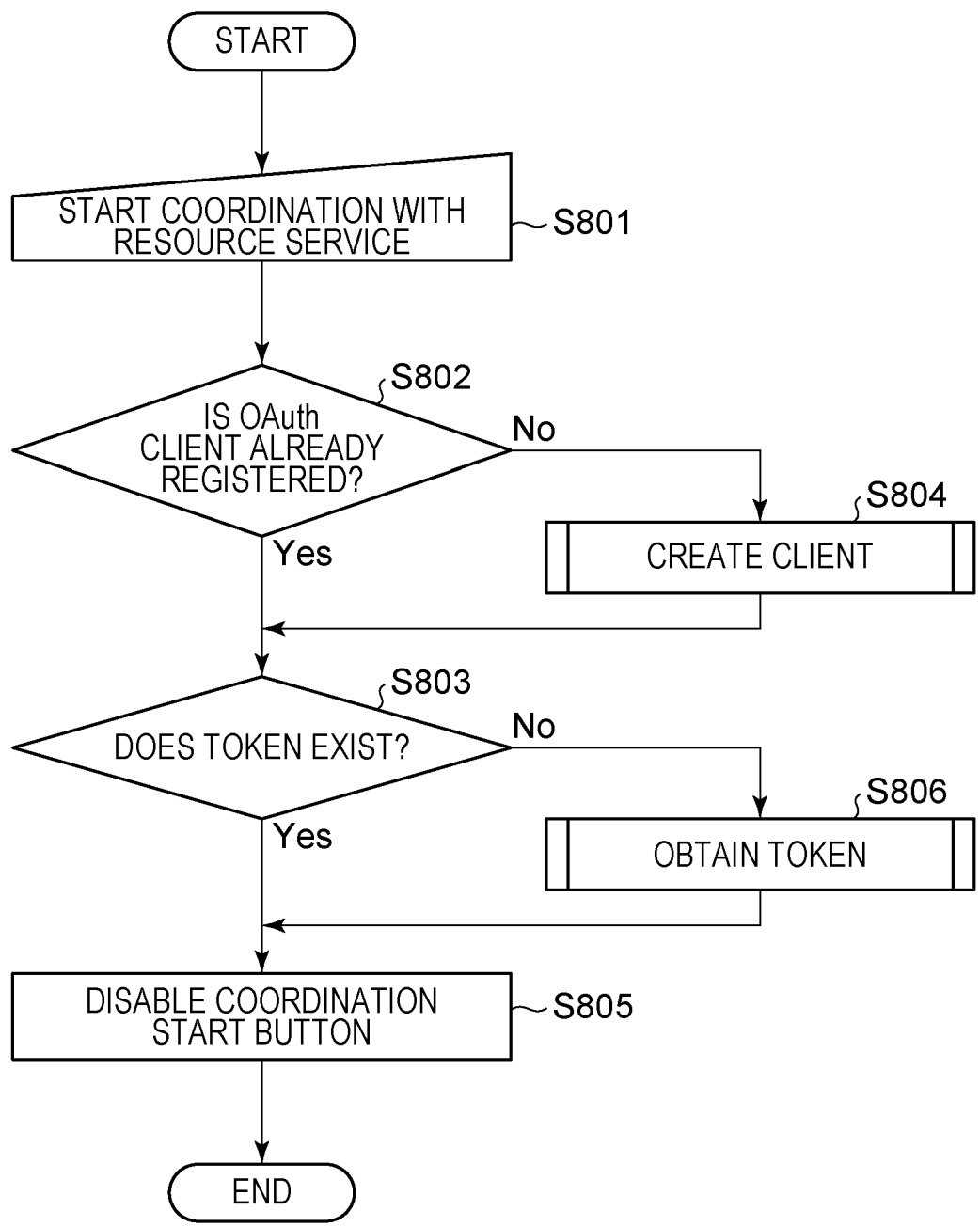
FIG. 8 is a flow chart illustrating an operation of coordination setting processing of the client application according to the exemplary embodiment of the present invention.

FIG. 8 is a flow chart for the client application 107 and the resource service 103 to start the system coordination according to the present exemplary embodiment. It should be noted that the processes in the respective steps in the flow chart are realized when the CPU included in the client server 106, the resource server 102, or the authorization server 104 reads and executes the control program according to the exemplary embodiment of the present invention stored in the non-volatile storage unit such as the ROM or the HDD.

Figure 9:
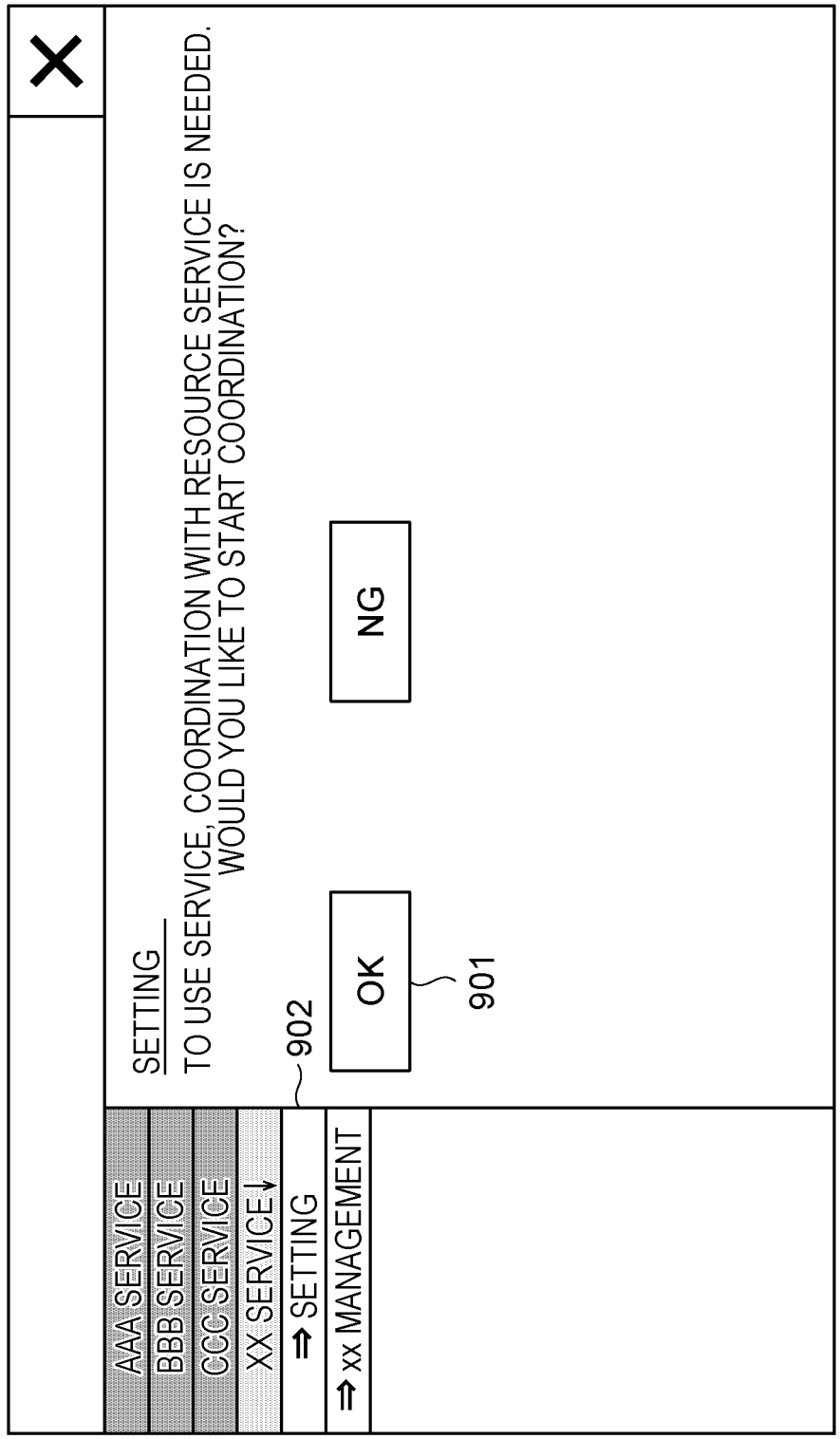
FIG. 9 illustrates an example of a coordination setting screen of the client application according to the exemplary embodiment of the present invention.

In step S801, since the customer user uses the service using the resource of the resource service 103, the client application 107 is accessed from the Web browser 701 of the management terminal 101, and a coordination start button with the resource service 103 is pressed. Specifically, when an OK button 901 of FIG. 9 is pressed, the processing is started.

In step S802, the system coordination management unit 303 validates the authentication information of the user which is included in the Cookie information of the Web browser 701 and the user ID and validates whether or not the OAuth client associated with the user ID is already registered. The customer ID associated with the user ID is obtained from the user management table 312, and the customer tenant ID associated with the customer ID is obtained from the customer mapping table 313. Then, the OAuth client associated with the customer tenant ID is obtained from the client management table 314 to perform the validation. When the OAuth client is already registered, the flow proceeds to step S803. When the OAuth client is not already registered, the flow proceeds to step S804.

In step S803, the token management unit 309 validates whether or not the access token associated with the tenant ID exists from the token management table 315. When the access token exists, the flow proceeds to step S805. When the access token does not exist, the flow proceeds to step S806. In step S805, the Web UI unit 305 disables the coordination start button. Specifically, a setting menu 902 of FIG. 9 is disabled. In step S804, the client management unit 308 performs the client creation processing. A detail thereof will be described with reference to FIGS. 10A and 10B. In step S805, the token management unit 309 performs the token obtaining processing. A detail thereof will be described with reference to FIG. 12.

Client Creating Sequence

Figure 10A:
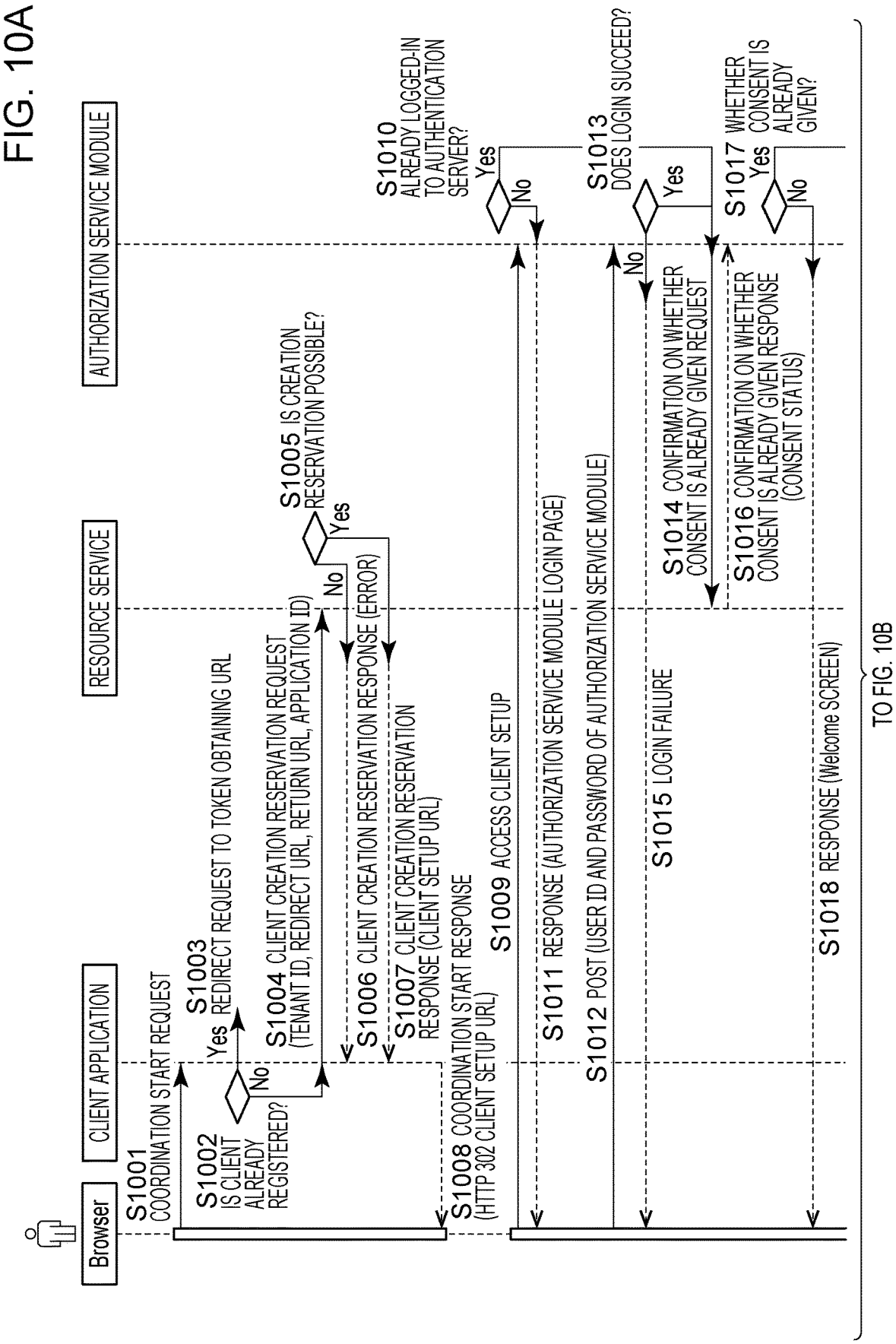

FIGS. 10A and 10B illustrate a sequence of the client creation according to the present exemplary embodiment. It should be noted that the processes in the respective steps in the sequence are realized when the CPU included in the client server 106, the resource server 102, or the authorization server 104 reads and executes the control program according to the exemplary embodiment of the present invention stored in the non-volatile storage unit such as the ROM or the HDD.

In step S1001, the customer user (resource owner) transmits the HTTP request of the coordination start with the resource service 103 from the Web browser 701. Specifically, when the OK button 901 of FIG. 9 is pressed, the HTTP request is transmitted, and the processing is started. In step S1002, the system coordination management unit 303 specifies the customer tenant ID of the resource service 103 from the user management table 312 and the customer mapping table 313 and confirms whether or not the OAuth client associated with the tenant of the resource service 103 is already registered. When the OAuth client is already registered, in step S1003, the system coordination management unit 303 performs the redirect request for the Web browser 701 to redirect to the token obtaining URL. The token obtaining URL is similar processing to step S1033 and step S1201 at the end point of the client application 107 where the flow for obtaining the access token is processed. When the OAuth client is not yet registered, the flow proceeds to step S1004.

In step S1004, the client management unit 308 transmits the client creation reservation request to the resource service 103. The client creation reservation request includes the customer tenant ID, the redirect URL, and the return URL. The redirect URL and the return URL are created while the customer tenant ID is included in the URL when the client creation reservation request is transmitted. In addition, the request is made while the access token dispensed from the authorization service module 105 is previously included in the authentication header. This access token is an access token obtained by using the client ID and the secret created by the Client Credentials grant managed in the credential management table 316. The client ID and the secret used herein are the client ID and the secret registered in the authorization service module 105 as the sales company resource owned by the client application 107.

In step S1005, the client management unit 408 validates whether or not the client creation reservation request is accepted in step S1004. First, when the Web service unit 406 obtains the request in step S1004, the authentication unit 403 requests the authorization service module 105 for the validation of the access token included in the authentication header. When the authentication success is returned to the authentication unit 403 from the authorization service module 105, the client management unit 408 accesses the sales company-customer relation management table 410 having the sales tenant ID where the access can be made by using the access token. Subsequently, it is validated whether or not the customer tenant ID included in the request in step S1004 can be accessed. In a case where the access can be made, the customer tenant ID, the application ID, the redirect URL, the return URL, and the status set as waiting for the creation are registered in the client management table 411. It should be noted that the client creation reservation request is accepted in a case where the client creation reservation request is not yet registered in the client management table 411 or the status is set as waiting for the creation while the customer tenant ID and the application ID are used as keys. In a case where the status of the client management table 411 is set as creation already performed or provision already performed, in step S1006, an error is returned to the client application 107 as a response in step S1004.

When the client creation reservation request is accepted, the client management unit 408 stores the customer tenant ID, the redirect URL, the return URL, and the application ID in the client management table 411 and updates the status as waiting for the creation. Then, the flow proceeds to step S1007.

In step S1007, the client management unit 408 returns a client setup URL as a response to the client creation reservation request in step S1004. The client setup URL is the end point for performing the OAuth client creation processing in the authorization service module 105.

In step S1008, the client management unit 308 performs the redirect request for the Web browser 701 to redirect to the client setup URL returned in step S1007. The redirect request herein is performed by using an HTTP/1.1 status code "302" in the Web browser 701. In step S1009, the Web browser 701 redirects to the client setup URL in accordance with the redirect request in step S1008. In step S1010, when the redirect process from the Web browser 701 to the client setup URL is performed, the authentication unit 403 enquires the authorization service module 105 to validate whether or not login to the resource service 103 has been already performed on the basis of the Cookie information of the Web browser 701. The authentication unit 502 of the authorization service module 105 validates whether or not the login has been already performed. When the login has been already performed, the flow proceeds to step S1014. When the login has not yet been performed, the flow proceeds to step S1011.

Figure 11:
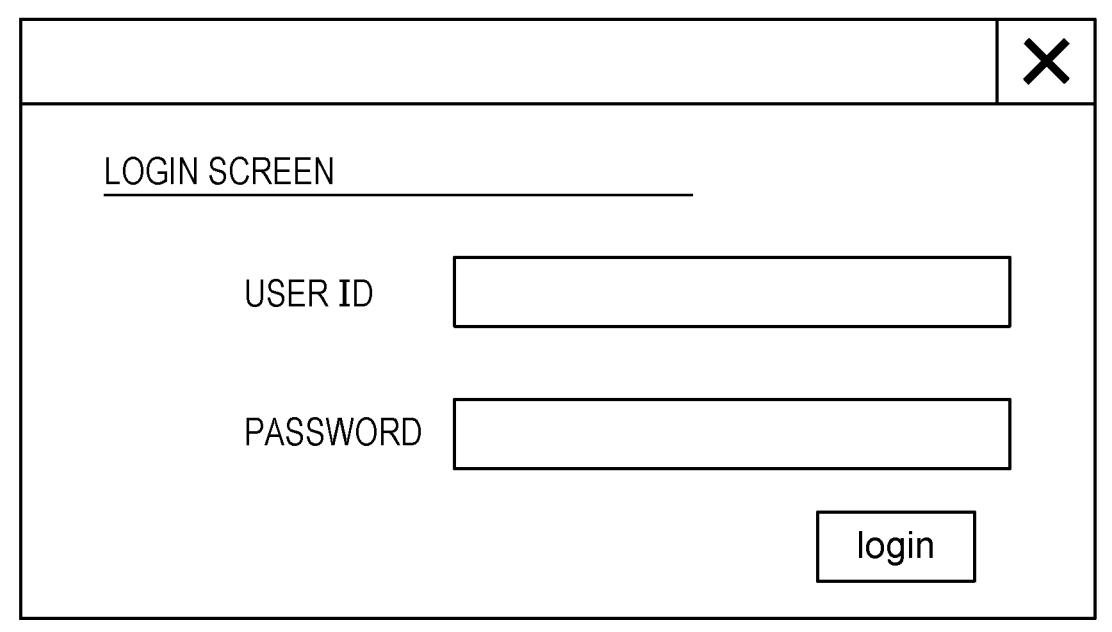

In step S1011, the authentication unit 502 performs the redirect request for the Web browser 701 to redirect to the login page of the authorization service module 105. Specifically, the login screen illustrated in FIG. 11 is displayed on the Web browser 701. In step S1012, the customer user (resource owner) executes the login process by inputting the user ID and the password to the login screen displayed on the Web browser 701. It should be noted that the user ID and the password specified herein are the user ID with which it is possible to access the customer tenant where the OAuth client is desired to be created and the password.

In step S1013, the authentication unit 502 validates whether or not the combination of the user ID and the password accepted in step S1011 is matched with the information registered in the user management table 510, and the flow proceeds to step S1014 in a case where the combination is matched with the information. Subsequently, the authentication information is stored as the Cookie information with respect to the Web browser 701. In a case where the combination is not matched with the information, in step S1015, the error is returned to the Web browser 701. In a case where the error is returned to the Web browser 701 in step S1015, since the client management table 411 has the status as waiting for the creation in step S1005, the processing needs to be started again from the transmission of the HTTP request of the coordination start in step S1001. Alternatively, the client application 107 transmits the client deletion reservation to the resource service 103, and the client creation reservation needs to be deleted from the client management table 411.

In step S1014, the authentication unit 502 enquires the resource service 103 on whether or not the customer tenant ID associated with the user ID validated in step S1012 is in the service start state. According to the present exemplary embodiment, the device management service corresponding to the resource service 103 does not start the service unless the customer gives consent for the sales company to access the customer resource. For this reason, whether or not the service is in the start state is determined on the basis of the consent status in the sales company-customer relation management table 410. In step S1016, the tenant management unit 402 returns the consent status associated with the customer ID specified as a response in step S1013. In step S1017, the authentication unit 502 validates whether or not the consent status returned in step S1014 indicates that the consent is already given. When the consent is already given, the flow proceeds to step S1024. When the consent is not yet given, the flow proceeds to step S1018.

In step S1018, the Web UI unit creates an HTML for receiving the consent and performs the redirect request for the Web browser 701 to redirect. In step S1019, the Web browser 701 redirects to a consent screen in accordance with the redirect request in step S1016. Specifically, the Web browser 701 redirects to the consent screen of FIG. 12, and the consent is given for the user of the sales company to access the resource and provide the service. In step S1020, the tenant management unit 402 validates whether the consent is given in step S1017. In a case where the consent is not given, the flow proceeds to step S1021. In a case where the consent is given, the consent status in the sales company-customer relation management table 410 is updated as consent already given, and the flow proceeds to step S1022.

In step S1022, the tenant management unit 402 performs the redirect request for the Web browser 701 to redirect to the client setup URL. In step S1023, the Web browser 701 redirects to the client setup URL in accordance with the redirect request in step S1019. In step S1024, the client management unit 408 validates whether or not a client creation reservation flag associated with the customer tenant ID specified from the authentication information included in the Cookie information of the Web browser 701 exists. The authentication information included in the Cookie information of the Web browser 701 is the authentication information of the customer user who has operated the Web browser 701 which is stored in step S1012. The client creation reservation flag refers to a record indicating that the status of the client management table 411 is set as waiting for the creation and is created by the client creation reservation accepted in step S1005. In a case where the client creation reservation flag exists, the flow proceeds to step S1025. When the client creation reservation flag does not exist, an error is returned to the Web browser 701 in step S1026.

In step S1025, the client management unit 408 transmits the client creation request to the authorization service module 105. The client creation request includes the client name, the redirect URL, and the like. In step S1027, when the client creation request in step S1025 is received, the client management unit 504 creates the OAuth client to be stored in the client management table 511. Subsequently, the issued ID and the secret of the OAuth client are returned as the response to the client creation request in step S1025.

In step S1028, the client management unit 408 stores the ID and the secret of the OAuth client returned in step S1027 in the client management table 411. Subsequently, the status of the client management table 411 is updated as creation already performed.

In step S1029, the client management unit 408 obtains the return URL of the client management table 411. In step S1030, the client management unit 408 performs the redirect request for the Web browser 701 to redirect to the return URL. In step S1031, the Web browser 701 redirects to the return URL in accordance with the redirect request in step S1026. When the Web browser 701 accesses the return URL, it is possible to notify the client application 107 that the OAuth client has been created.

In step S1032, the client management unit 308 obtains the authentication information of the client application 107 included in the Cookie information of the Web browser 701 and obtains the validation of the user ID and the customer tenant ID associated with and the user ID. In step S1033, the client management unit 308 transmits the client obtainment request with respect to the customer tenant ID obtained in step S1032 to the resource service 103. At this time, the client obtainment request performs the request while the access token similar to that in step S1004 is included in the authentication header.

In step S1034, the client management unit 408 specifies the sales company tenant ID from the access token included in the header of the client obtainment request similarly as in step S1005 and validates whether or not an access can be made to the customer tenant ID included in the client obtainment request. When the access can be made, it is validated whether or not the OAuth client is already created on the basis of the client management table 411. Whether or not the OAuth client is already created is determined by whether or not the status is set as creation already performed. In a case where the client is not yet created, in step S1035, an error is returned to the client application 107 as a response in step S1033. In a case where the client is already created, the flow proceeds to step S1036.

In step S1036, the client management unit 408 returns the ID and the secret of the OAuth client as a response in step S1033 to the client application 107. In step S1037, the client management unit 308 saves the ID and the secret of the OAuth client returned in step S1036 in the client management table 314 while being associated with the customer tenant ID. In step S1038, the system coordination management unit 303 performs the redirect request for the Web browser 701 to redirect to the token obtaining URL.

Access Token Creating Sequence

Figure 12:
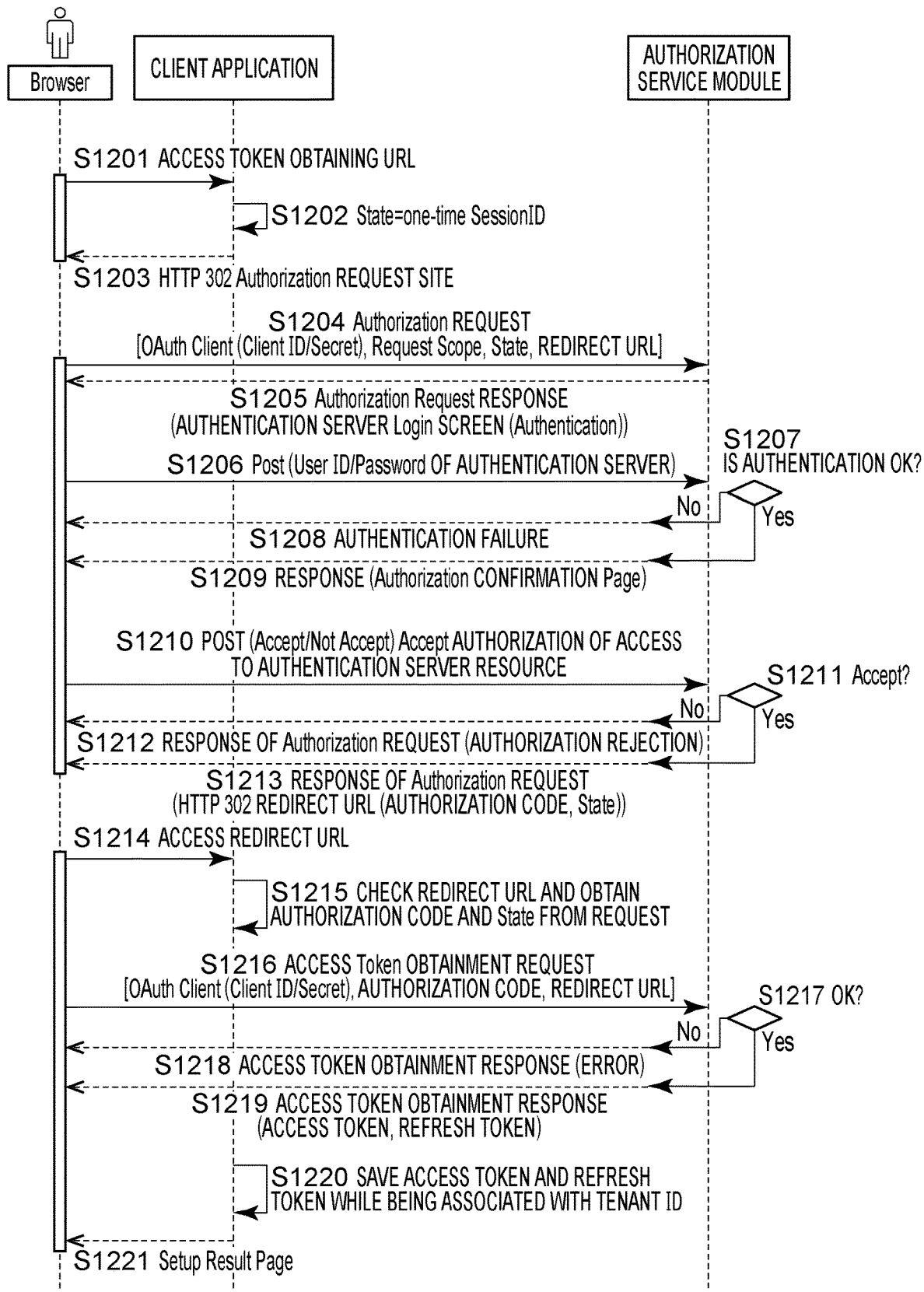
FIG. 12 illustrates a token obtaining sequence according to the exemplary embodiment of the present invention.

FIG. 12 is a sequence diagram illustrating an operation for the client application 107 to obtain the token according to the present exemplary embodiment. It should be noted that the respective steps in the sequence are realized when the CPU included in the client server 106 or the authorization server 104 reads and executes the control program according to the exemplary embodiment of the present invention stored in the non-volatile storage unit such as the ROM or the HDD. In this sequence, only the processing related to the exemplary embodiment of the present invention will be described, and descriptions of the other processing will be omitted as being different from the gist of embodiments of the present invention.

In step S1201, the Web browser 701 redirects to the token obtaining URL in accordance with the redirect request in step S1033. In step S1202, the token management unit 309 generates a one-time session ID for tracking of obtaining the token. In step S1203, the token management unit 309 validates the authentication information included in the Cookie information of the browser and the user ID and obtains the customer tenant ID associated with the user ID. Subsequently, the redirect request is performed for the Web browser 701 to redirect to an Authorization request site. The ID and the secret of the OAuth client associated with the customer tenant ID saved in the client management table 314, the redirect URL, and the generated one-time session ID are assigned to an Authorization request as State information, and the redirect request is performed.

In step S1203, the Web browser 701 redirects to the Authorization request site in accordance with the redirect request in step S1202. In step S1204, the token management unit 309 returns the HTML of the login screen (FIG. 11) of the authorization service module 105 as the response of the Authorization request. In step S1205, the Web browser 701 displays the login screen in step S1204.

In step S1206, when the customer user who is the resource owner inputs a login ID and the password from the Web browser 701, the HTTP request is transmitted. In step S1207, the authentication unit 502 performs the validation of the user ID and the password requested in step S1205. The validation is performed by using the information registered in the user management table 510. In the case of the authentication failure, in step S1208, an error is returned to the Web browser 701 as a response in step S1206. In the case of the authentication success, the flow proceeds to step S1209. In step S1209, the authentication unit 502 performs the redirect request for the Web browser 701 to redirect to the Authentication confirmation page.

Figure 13:
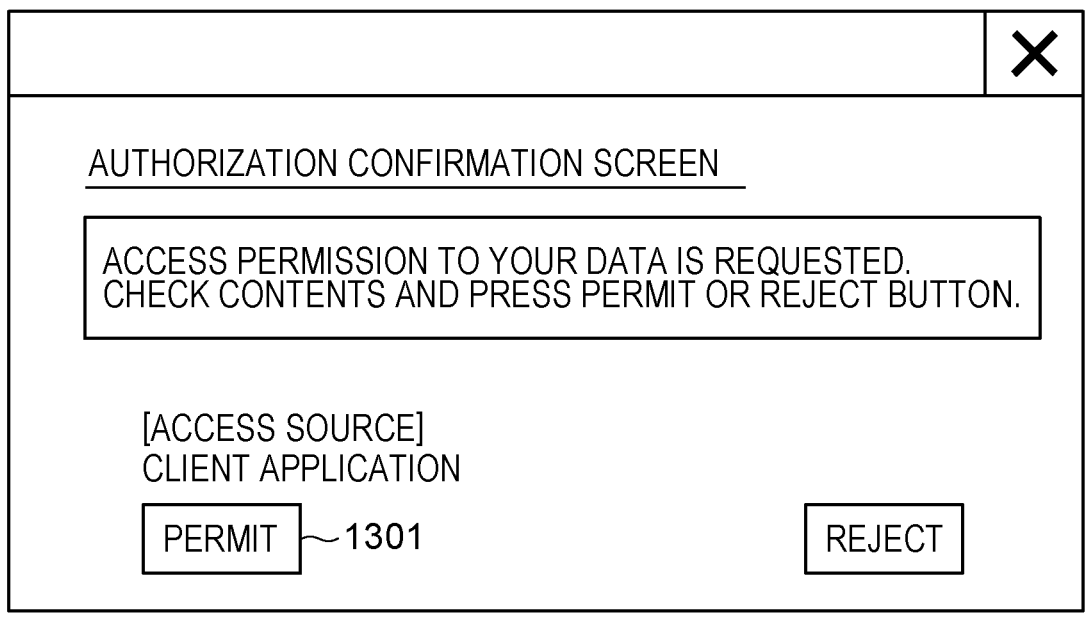
FIG. 13 illustrates an example of an authorization confirmation screen of an authorization service module according to the exemplary embodiment of the present invention.

In step S1210, the Web browser 701 directs to the Authorization confirmation page (FIG. 13). Subsequently, an effect indicating that the client application 107 is permitted to access the protected resource of the resource service 103 is obtained by an input of the customer user. This action will be referred to as an authorization. As a specific example of the authorization, an HTTP request indicating permission is transmitted when the customer user who is the resource owner presses a permit button 1301 of FIG. 13.

In step S1211, the token management unit 503 validates whether or not on the client application 107 is permitted to access the protected resource of the resource service 103 on the basis of the request in step S1210. In a case where no access is permitted, in step S1212, an error is returned to the Web browser 701 as a response in step S1210. In a case where the access is permitted, the flow proceeds to step S1213. In step S1213, the token management unit 503 performs the redirect request for the Web browser 701 to redirect to the redirect URL included in the Authorization request in step S1203. An authorization code and the State information are assigned to the redirect request.

In step S1214, the Web browser 701 redirects to the redirect URL in accordance with the redirect request in step S1210. In step S1215, the token management unit 309 validates the redirect URL and obtains the authorization code assigned to the request and the State information. Subsequently, the authorization code is saved in the token management table 315. In step S1216, the token management unit 309 transmits the access token obtainment request. The ID and the secret of the OAuth client, the authorization code saved in step S1215, and the redirect URL are assigned to the access token obtainment request.

In step S1217, the token management unit 503 performs the validation of the ID and the secret of the OAuth client included in the request in step S1216, the redirect URL, and the authorization code. The validation is performed on the basis of the information in the token management table 512 and the client management table 511. In a case where the validation fails, in step S1218, an error is returned to the Web browser 701 as a response in step S1216. When the validation is OK, the access token and the refresh token are created, and the flow proceeds to step S1219. The created access token and the refresh token are saved in the token management table 512.

In step S1219, the token management unit 503 returns the access token and the request token as a response to the access token obtainment request in step S12016. In step S1217, the token management unit 309 saves the access token and the refresh token returned in step S1219 in the token management table 315 while being associated with the customer tenant ID. In step S1220, the token management unit 309 transmits an HTML of completion of the token obtainment to the Web browser 701. Subsequently, the flow transits to step S805, and the setting menu 902 of FIG. 9 is disabled.

API Calling Flow

Figure 14:
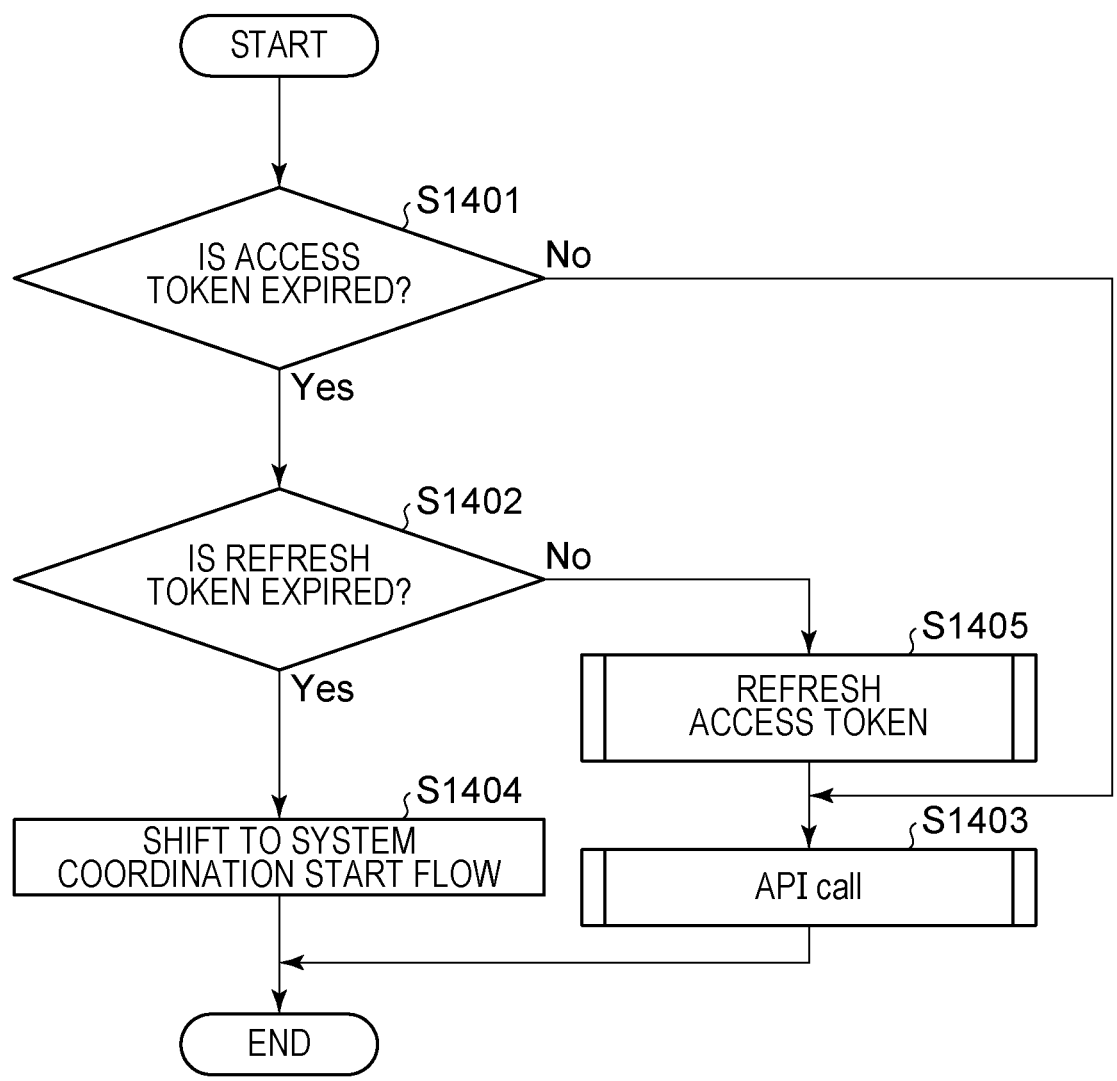
FIG. 14 is a flow chart illustrating a token obtaining operation of the client application according to the exemplary embodiment of the present invention.

FIG. 14 is a flow chart for the client application 107 to call out the API of the resource service 103 according to the present exemplary embodiment. It should be noted that the processes in the respective steps in the flow chart are realized when the CPU included in the client application 107 reads and executes the control program according to the exemplary embodiment of the present invention stored in the non-volatile storage unit such as the ROM or the HDD. In this flow, only the processing related to the exemplary embodiment of the present invention will be described, and descriptions of the other processing will be omitted as being different from the gist of embodiments of the present invention.

In step S1401, the token management unit 309 validates whether or not the access token associated with the tenant ID is expired on the basis of the token management table 315. The tenant ID is obtained as follows. After the user logs in to the client application 107, the authentication information included in the Cookie information of the Web browser 701 and the user ID are validated to obtain the customer tenant ID associated with the user ID. In addition, whether or not the access token is expired is determined on the basis of the access token validity period. In a case where the access token is expired, the flow proceeds to step S1402. When the access token is within the validity period, the flow proceeds to step S1403.

In step S1402, the token management unit 309 validates whether or not the refresh token associated with the tenant ID is expired on the basis of the token management table 315. Whether or not the refresh token is expired is determined on the basis of the refresh token validity period. In a case where the refresh token is expired, the flow proceeds to step S1404. When the refresh token is within the validity period, the flow proceeds to step S1405.

In step S1404, the token management unit 309 returns an HTML to the Web browser 701 so as to shift to the system coordination start flow of FIG. 8. Subsequently, the setting menu 902 of FIG. 9 is enabled. In step S1403, the token management unit 309 assigns the access token to a request header to call out the API of the resource service 103. In step S1405, the token management unit 309 obtains the access token again by using the refresh token.

API Calling Sequence

FIG. 15 is a sequence for the client application 107 to call out the API of the resource service 103 according to the present exemplary embodiment. It should be noted that the processes in the respective steps in the sequence are realized when the CPU included in the client application 107 reads and executes the control program according to the exemplary embodiment of the present invention stored in the non-volatile storage unit such as the ROM or the HDD. In this flow, only the processing related to the exemplary embodiment of the present invention will be described, and descriptions of the other processing will be omitted as being different from the gist of embodiments of the present invention.

In step S1501, the Web browser 701 requests the client application 107 to obtain an HTML and JavaScript (registered trademark). In step S1502, the client application 107 returns the requested HTML and JavaScript as a response in step S1501. In step S1503, the Web browser 701 obtains a REST API from JavaScript returned in step S1502. In step S1504, the Web browser 701 requests the client application 107 for the REST API request. The Web browser 701 performs the transmission while the authentication information is included in the Cookie information. The request of the REST API is transmitted to an FQDN of the client application 107.

In step S1505, the user management unit 306 validates the authentication information included in the Cookie information of the Web browser 701 with the user ID in the user management table 312 and obtains the customer tenant ID associated with the user ID from the customer mapping table 313. In step S1506, the token management unit 309 validates whether or not the access token associated with the tenant ID obtained in step S1505 exists on the basis of the token management table 315. In a case where the token is expired, the flow proceeds to step S1507. When the token is not expired, the flow proceeds to step S1511.

In step S1507, the token management unit 309 requests for the authorization service module 105 to refresh the access token. The OAuth client ID and the secret associated with the tenant ID in the client management table 314 and the refresh token are used for the refresh request. In step S1508, the OAuth client ID and the secret and the refresh token obtained in step S1507 by the token management unit 503 from the token management table 512 and the client management table 511 are validated. As a result of the validation, when the validation is correct, a new access token and a new refresh token are issued, and the time limit of the access token and the time limit of the refresh token are also updated to update the token management table 512. Subsequently, as a response in step S1507, the new access token and the new refresh token and the time limits of the respective tokens are returned.

In step S1509, the token management unit 309 saves the respective tokens and the time limits obtained in step S1508 in the token management table 315 while being associated with the customer tenant ID. In step S1510, the API calling unit 310 converts an FQDN of the REST API in step S1503 from the FQDN of the client application to an FQDN of the resource service. In step S1511, the API calling unit 310 performs the request of the REST API with respect to the resource service 103. The request is performed by assigning the access token to the authentication header of REST API. In step S1512, the authentication unit 403 performs the validation of the access token included in the authentication header of the REST API request in step S1511. The authentication unit 403 requests the token management unit 503 for the validation of the access token, and the validation with the token management table 512 is performed.

In step S1513, when the validation of the access token succeeds in step S1512, the API management unit 404 processes the REST API requested in step S1511 and returns the resource. In step S1514, the API calling unit 310 returns the resource returned in step S1513 to the Web browser 701 as a response in step S1504. It should be noted that the client application 107 may process the returned resource and return the generated resource as a result of the process as the response. In step S1515, the Web browser 701 displays a Webpage by using the resource returned in step S1514.

Client Deleting Sequence

FIGS. 16A and 16B illustrate a client deleting sequence according to the present exemplary embodiment. It should be noted that the processes in the respective steps in the sequence are realized when the CPU included in the client server 106, the resource server 102, or the authorization server 104 reads and executes the control program according to the exemplary embodiment of the present invention stored in the non-volatile storage unit such as the ROM or the HDD.

In step S1601, the customer user (resource owner) transmits the HTTP request for the coordination cancellation with the resource service 103 from the Web browser 701. In step S1602, the system coordination management unit 303 confirms whether or not the customer tenant ID of the resource service 103 from the user management table 312 and the customer mapping table 313 and confirms whether or not the OAuth client associated with the tenant of the resource service 103 is already registered. When the OAuth client is not yet registered, in step S1603, the coordination cancellation success is returned as a response in step S1601. When the OAuth client is already registered, the flow proceeds to step S1604. When the coordination start button is pressed, the creation reservation of the OAuth client is transmitted to the resource service 103. However, in a case where the user does not authorize the authority transfer thereafter, since a situation in which the OAuth client is not registered may occur, the confirmation is performed in step S1602.

In step S1604, the client management unit 308 transmits the client deletion reservation request to the resource service 103. The client deletion reservation request includes the customer tenant ID. The request is performed while the access token previously dispensed from the authorization service module 105 to the authentication header is included. This access token is an access token obtained by using the client ID and the secret created by the Client Credentials grant managed in the credential management table 316. The client ID and the secret used herein are the client ID and the secret registered in the authorization service module 105 as the sales company resource owned by the client application 107.

In step S1605, it is validated whether or not the client management unit 408 can accept the client deletion reservation request in step S1604. First, when the Web service unit 406 obtains the request in step S1604, the authentication unit 403 requests the authorization service module 105 for the validation of the access token included in the authentication header. When the authentication success is returned to the authentication unit 403 from the authorization service module 105, the client management unit 408 accesses the sales company-customer relation management table 410 having the sales tenant ID where the access can be made by using the access token. Subsequently, it is validated whether or not an access can be made to the customer tenant ID included in the request in step S1604. In a case where the access can be made, the status associated with the customer tenant ID is confirmed from the client management table 411. In a case where the status is set as provision already performed and creation already performed, the flow proceeds to step S1607. In the case of the other status such as, for example, waiting for the creation, the flow proceeds to step S1606.

In step S1606, the client management unit 408 deletes the information associated with the customer tenant ID in the client management table 411 and returns the deletion success as a response in step S1604. In step S1606, a state is established in which the OAuth client is not yet created in the authorization service module 105, and also the client creation reservation is set in the client management table 411 of the resource service 103. For this reason, it is sufficient that only the information in the client management table 411 which needs to be deleted is deleted with respect to the client deletion reservation request in step S1604.

In step S1607, the client management unit 408 returns the end point of the client setup URL as the response to the client deletion reservation request in step S1004. In step S1607, a state is established in which the OAuth client is already registered in the authorization service module 105, and also the client information is registered in the client management table 411 of the resource service 103. For this reason, the information of the resource service 103 and the OAuth client information the authorization service module 105 needs to be deleted with respect to the client deletion reservation request in step S1604. The OAuth client of the authorization service module 105 needs to be deleted by the Web browser 701 under the consent of the customer user. Therefore, the status of the client management table 411 is updated as waiting for the deletion. Subsequently, the client setup URL is returned to the Web browser 701 as a response in step S1604 so as to redirect to the client setup URL corresponding to the end point for the OAuth client deletion processing of the authorization service module 105.

In step S1608, the client management unit 308 performs the redirect request for the Web browser 701 to redirect with respect to the client setup URL returned in step S1607. The redirect request herein is performed by using the HTTP/1.1 status code "302" in the Web browser 701. In step S1609, the Web browser 701 redirects to the client setup URL in accordance with the redirect request in step S1608.

In step S1610, when the redirect process from the Web browser 701 to the client setup URL is performed, the authentication unit 403 enquires the authorization service module 105 to validate whether or not login to the resource service 103 has been already performed on the basis of the Cookie information of the Web browser 701. The authentication unit 502 of the authorization service module 105 validates whether or not the login has been already performed. When the login has been already performed, the flow proceeds to step S1614. When the login has not yet been performed, the flow proceeds to step S1611. In step S1611, the authentication unit 502 performs the redirect request for the Web browser 701 to redirect to the login page of the authorization service module 105. Specifically, the login screen illustrated in FIG. 11 is displayed on the Web browser 701.

In step S1612, the customer user (resource owner) executes the login process by inputting the user ID and the password to the login screen displayed on the Web browser 701. It should be noted that the user ID and the password specified herein are the user ID and the password with which it is possible to access the customer tenant where the OAuth client is desired to be deleted.

In step S1613, the authentication unit 502 validates whether or not the combination of the user ID and the password accepted in step S1011 is matched with the information registered in the user management table 510, and the flow proceeds to step S1614 in a case where the combination is matched with the information. Subsequently, the authentication information is stored as the Cookie information with respect to the Web browser 701. In a case where the combination is not matched with the information, in step S1615, the error is returned to the Web browser 701. In step S1615, in a case where the error is returned to the Web browser 701, in step S1615, since the client management table 411 has the status as waiting for the creation, the processing needs to be started from the HTTP request for the coordination cancellation in step S1601 again.

In step S1614, the authentication unit 502 enquires the resource service 103 whether or not the customer tenant ID associated with the user ID validated in step S1612 is in a service start state. According to the present exemplary embodiment, the device management service corresponding to the resource service 103 does not start the service unless the customer user gives consent for the sales company to access the customer resource. For this reason, whether the service is in the start state is determined on the basis of the consent status in the sales company-customer relation management table 410.

In step S1616, the tenant management unit 402 returns the consent status associated with the customer tenant ID specified as a response in step S1613. In step S1617, the authentication unit 502 validates whether or not the consent status returned in step S1614 is set as consent already given. When the consent is already given, the flow proceeds to step S1624. When the consent is not yet given, the flow proceeds to step S1618. In step S1618, the Web UI unit creates the HTML for receiving the consent and performs the redirect request for the Web browser 701 to redirect. In step S1619, the Web browser 701 redirects to the consent screen in accordance with the redirect request in step S1616. Specifically, the Web browser 701 redirects to the consent screen of FIG. 12, and the consent is given that the user of the sales company accesses the resource and provides the service.

In step S1620, the tenant management unit 402 validates whether or not the consent is given in step S1617. In a case where the consent is not given, the flow proceeds to step S1621. In a case where the consent is given, the consent status in the sales company-customer relation management table 410 is updated as consent already given, and the flow proceeds to step S1622.

In step S1622, the tenant management unit 402 performs the redirect request for the Web browser 701 to redirect to the client setup URL. In step S1623, the Web browser 701 redirects to the client setup URL in accordance with the redirect request in step S1619. In step S1624, the client management unit 408 validates whether or not a client deletion reservation flag associated with the customer tenant ID specified from the authentication information included in the Cookie information of the Web browser 701 exists. The authentication information included in the Cookie information of the Web browser 701 the authentication information of the customer user who has operated the Web browser 701 which is stored in step S1612. The client deletion reservation flag refers to a record that the status of the client management table 411 is set as waiting for the deletion and is created by the client deletion reservation accepted in step S1607. In a case where the client deletion reservation flag exists, the flow proceeds to step S1625. When the client deletion reservation flag does not exist, in step S1626, an error is returned to the Web browser 701 as a response in step S1623.

In step S1625, the client management unit 408 transmits a client deletion request to the authorization service module 105. The client deletion request includes the client name and the like. In step S1627, when the client management unit 504 receives the client deletion request in step S1625, the OAuth client stored in the client management table 511 is deleted. Subsequently, the deletion success is returned as a response to the client deletion request in step S1625. In step S1628, the return URL stored in the client management table 411 is obtained and stored in the ROM 202. Subsequently, step S1629, the client management unit 408 deletes the information of the OAuth client from the client management table 411.

In step S1630, the client management unit 408 performs the redirect request for the Web browser 701 to redirect to the return URL held in the ROM 202 in step S1628. In step S1631, the Web browser 701 redirects to the return URL in accordance with the redirect request in step S1630. In step S1632, the client management unit 308 obtains the authentication information of the client application 107 included in the Cookie information of the Web browser 701 and obtains the validation of the user ID and the customer tenant ID associated with and the user ID. In step S1633, the client management unit 308 deletes the OAuth client with respect to the customer tenant ID obtained in step S1632 from the client management table 314. In step S1634, the client management unit 308 returns the deletion success as a response in step S1631.

According to the present exemplary embodiment, the OAuth client is created for each access range of the resource, and the association check with the access range is intentionally performed at the time of the OAuth client creation and the access token obtainment and management. Therefore, the security is further enhanced. In addition, when the OAuth client and the access token are issued, the check on the access range of the resource can be performed by way of pseudo-check by using the redirect URL, so that the check on the authorization service side is also strengthened.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-107075 filed May 30, 2017, which is hereby incorporated by reference herein in its entirety.

What is claimed is:

1. A system comprising:
a terminal including a Web browser;
a client accessed by using the Web browser;
a resource server configured to provide a resource in accordance with a service request from the client; and
an authorization server configured to authenticate a user and also issue an access token indicating that an authority of the user in the resource server is transferred in accordance with an authorization of the authenticated user,
wherein the client includes a creation software configured to create a redirect URL indicating a transmission destination of an authorization code used for obtaining the access token for a customer tenant,
wherein the client that has received a request for starting a coordination from the Web browser includes a first transmission unit configured to transmit the redirect URL of the customer tenant specified from information transmitted by the Web browser to the resource server together with a client creation reservation,
wherein the resource server that has received the client creation reservation includes a second transmission unit configured to transmit the redirect URL to the authorization server together with a client creation request,
wherein the authorization server that has received the client creation request includes a first storage unit configured to store created client information and the redirect URL while being associated with each other,
wherein the authorization server includes a redirect request unit configured to request the Web browser to redirect to the redirect URL of the customer tenant specified from the information transmitted by the Web browser in a case where the authorization code is created in accordance with the user who has authorized a transfer of the authority in the resource server to the client via the Web browser,
wherein the client that has received the authorization code from the Web browser that accesses in accordance with an instruction of the redirect includes a second storage unit configured to receive the access token from the authorization server on a basis of the authorization code and the client information and store a tenant ID of the customer tenant corresponding to the redirect URL and the access token while being associated with each other,
wherein the first transmission unit of the client that has received a request for canceling the coordination from the Web browser transmits a client deletion reservation to the resource server,
wherein the resource server includes a confirmation unit configured to confirm whether or not the client information of the customer tenant is already created in a case where the client deletion reservation is received, and
wherein the resource server deletes the stored redirect URL in a case where the confirmation unit confirms that client information is not created and transmits an effect indicating that the stored redirect URL is deleted to the client.

2. The system according to claim 1, wherein the client that has received the service request from the Web browser further includes a response software configured to obtain the access token associated with a tenant ID of the customer tenant specified by the information transmitted by the Web browser from the second storage unit, request the resource server for the resource, and transmit, as a response, to the Web browser, a result obtained by processing the resource obtained from the resource server.

3. The system according to claim 1,
wherein the creation software also creates a return URL indicating a notification destination for notifying that the client information has been created in addition to the redirect URL for the customer tenant,
wherein the first transmission unit also transmits the return URL and the client creation reservation in addition to the redirect URL to the resource server,
wherein the second transmission unit also transmits the return URL and the client creation request in addition to the redirect URL to the resource server,
wherein the redirect request unit of the authorization server which has received the client creation request requests the Web browser to redirect to the return URL in accordance with the creation of the client information, and
wherein the client obtains the client information from the authorization server via the resource server in accordance with the access of the Web browser to the return URL.

4. The system according to claim 1,
wherein, in a case where the confirmation unit confirms that client information is created, the stored redirect URL and the stored client information are deleted, and the resource server transmits a deletion reservation of the client information to the authorization server, and
wherein the first storage unit of the authorization server which has received the deletion reservation deletes the client information.

5. The system according to claim 4, wherein, in a case where consent for starting the service with respect to the customer tenant is not obtained, the resource server that has received the deletion reservation transmits the deletion reservation of the client information to the authorization server after the consent is obtained from the user.

6. A method executed in a system including a terminal including a Web browser, a client accessed by using the Web browser, a resource server configured to provide a resource in accordance with a service request from the client, and an authorization server configured to authenticate a user and also issue an access token indicating that an authority of the user in the resource server is transferred in accordance with an authorization of the authenticated user, the method comprising:

creating a redirect URL indicating a transmission destination of an authorization code used for obtaining the access token for a customer tenant by a creation software of the client;

transmitting the redirect URL of the customer tenant specified from information transmitted by the Web browser to the resource server together with a client creation reservation by a first transmission unit of the client that has received a request for starting a coordination from the Web browser;

transmitting the redirect URL to the authorization server together with a client creation request by a second transmission unit of the resource server that has received the client creation reservation;

storing created client information and the redirect URL while being associated with each other by a first storage unit of the authorization server that has received the client creation request;

requesting the Web browser to redirect to the redirect URL of the customer tenant specified from the information transmitted by the Web browser by a redirect request unit of the authorization server in a case where the authorization code is created in accordance with the user who has authorized a transfer of the authority in the resource server to the client via the Web browser;

receiving the access token from the authorization server on a basis of the authorization code and the client information and storing a tenant ID of the customer tenant corresponding to the redirect URL and the access token while being associated with each other by a second storage unit of the client that has received the authorization code from the Web browser that accesses in accordance with an instruction of the redirect, wherein the first transmission unit of the client that has received a request for canceling the coordination from the Web browser transmits a client deletion reservation to the resource server, wherein the resource server includes a confirmation unit configured to confirm whether or not the client information of the customer tenant is already created in a case where the client deletion reservation is received, and wherein the resource server deletes the stored redirect URL in a case where the confirmation unit confirms that client information is not created and transmits an effect indicating that the stored redirect URL is deleted to the client.

7. The method according to claim 6, wherein a response software of the client that has received the service request from the Web browser obtains the access token associated with a tenant ID of the customer tenant specified by the information transmitted by the Web browser, requests the resource server for the resource, and transmit, as a response, to the Web browser, a result obtained by processing the resource obtained from the resource server.

8. The method according to claim 6,
wherein the creation software also creates a return URL indicating a notification destination for notifying that the client information has been created in addition to the redirect URL for the customer tenant, wherein the first transmission unit also transmits the return URL and the client creation reservation in addition to the redirect URL to the resource server, wherein the second transmission unit also transmits the return URL and the client creation request in addition to the redirect URL to the resource server, wherein the redirect request unit of the authorization server which has received the client creation request requests the Web browser to redirect to the return URL in accordance with the creation of the client information, and wherein the client obtains the client information from the authorization server via the resource server in accordance with the access of the Web browser to the return URL.

9. The method according to claim 6,
wherein, in a case where the confirmation unit confirms that client information is created, the stored redirect URL and the stored client information are deleted, and the resource server transmits a deletion reservation of the client information to the authorization server, and wherein the first storage unit of the authorization server which has received the deletion reservation deletes the client information.

10. The method according to claim 9, wherein, in a case where consent for starting the service with respect to the customer tenant is not obtained, the resource server that has received the deletion reservation transmits the deletion reservation of the client information to the authorization server after the consent is obtained from the user.

11. A non-transitory storage medium recording a method executed in a system including a terminal including a Web browser, a client accessed by using the Web browser, a resource server configured to provide a resource in accordance with a service request from the client, and an authorization server configured to authenticate a user and also issue an access token indicating that an authority of the user in the resource server is transferred in accordance with an authorization of the authenticated user, the method comprising:

creating a redirect URL indicating a transmission destination of an authorization code used for obtaining the access token for a customer tenant by a creation software of the client;

transmitting the redirect URL of the customer tenant specified from information transmitted by the Web browser to the resource server together with a client creation reservation by a first transmission unit of the client that has received a request for starting a coordination from the Web browser;

transmitting the redirect URL to the authorization server together with a client creation request by a second transmission unit of the resource server that has received the client creation reservation;

storing created client information and the redirect URL while being associated with each other by a first storage unit of the authorization server that has received the client creation request;

requesting the Web browser to redirect to the redirect URL of the customer tenant specified from the information transmitted by the Web browser by a redirect request unit of the authorization server in a case where the authorization code is created in accordance with the user who has authorized a transfer of the authority in the resource server to the client via the Web browser;

receiving the access token from the authorization server on a basis of the authorization code and the client information and storing a tenant ID of the customer tenant corresponding to the redirect URL and the access token while being associated with each other by a second storage unit of the client that has received the authorization code from the Web browser that accesses in accordance with an instruction of the redirect, wherein the first transmission unit of the client that has received a request for canceling the coordination from the Web browser transmits a client deletion reservation to the resource server, wherein the resource server includes a confirmation unit configured to confirm whether or not the client information of the customer tenant is already created in a case where the client deletion reservation is received, and wherein the resource server deletes the stored redirect URL in a case where the confirmation unit confirms that client information is not created and transmits an effect indicating that the stored redirect URL is deleted to the client.

* * * * *